United States Patent [19]
McBrayer, Jr. et al.

[11] Patent Number: 6,121,179
[45] Date of Patent: Sep. 19, 2000

[54] SUPERCRITICAL TREATMENT OF ADSORBENT MATERIALS

[75] Inventors: Roy N. McBrayer, Jr., Austin, Tex.;
Jos A. Boere, Amersfoort, Netherlands;
Lars Tidlund, Stenungsund, Sweden;
Richard W. Humphries, Austin, Tex.

[73] Assignee: Chematur Engineering AB, Karlskoga, Sweden

[21] Appl. No.: 09/004,403

[22] Filed: Jan. 8, 1998

[51] Int. Cl.[7] .............................. B01J 20/34; C09C 1/56; C01B 31/02
[52] U.S. Cl. .............................. 502/23; 502/22; 423/460; 423/461
[58] Field of Search ........................ 502/22, 23; 423/460, 423/461

[56] References Cited

U.S. PATENT DOCUMENTS

| | | |
|---|---|---|
| 3,816,338 | 6/1974 | Corson ..................................... 252/420 |
| 4,008,994 | 2/1977 | Numasaki et al. . |
| 4,061,556 | 12/1977 | Modell . |
| 4,075,281 | 2/1978 | Port et al. .............................. 423/206 |
| 4,094,815 | 6/1978 | Cedro, III et al. . |
| 4,113,446 | 9/1978 | Modell et al. . |
| 4,120,644 | 10/1978 | Numasaki et al. . |
| 4,124,528 | 11/1978 | Modell . |
| 4,141,829 | 2/1979 | Thiel et al. . |
| 4,147,624 | 4/1979 | Modell . |
| 4,261,805 | 4/1981 | Galliker et al. . |
| 4,292,953 | 10/1981 | Dickinson . |
| 4,338,199 | 7/1982 | Modell . |
| 4,377,066 | 3/1983 | Dickinson . |
| 4,380,960 | 4/1983 | Dickinson . |
| 4,398,295 | 8/1983 | Mihara et al. . |
| 4,462,904 | 7/1984 | Hager et al. . |
| 4,543,190 | 9/1985 | Modell . |
| 4,564,458 | 1/1986 | Burleson . |
| 4,593,202 | 6/1986 | Dickinson . |
| 4,594,164 | 6/1986 | Titmas . |
| 4,689,054 | 8/1987 | Vara et al. ................................... 55/61 |
| 4,714,526 | 12/1987 | Pennisi et al. . |

(List continued on next page.)

FOREIGN PATENT DOCUMENTS

| | | |
|---|---|---|
| 0 572 913 | 12/1993 | European Pat. Off. . |
| 0 708 058 | 4/1996 | European Pat. Off. . |
| 0 818 240 | 1/1998 | European Pat. Off. . |
| 0 818 240 A2 | 1/1998 | European Pat. Off. . |
| 25 44 116 | 4/1976 | Germany . |
| 27 16 798 | 10/1977 | Germany . |
| 87/01381 | 3/1987 | WIPO . |
| 90/06189 | 6/1990 | WIPO . |

OTHER PUBLICATIONS

Cocero, et al, "SCWRO Process For Regeneration Of Activated Carbon And Destruction Of Pollutants In Supercritical Water," Proceedings of the Chemviron Carbon Award Meeting, University of Leuven, May 29–30, 1997, Norit N.V. Publishers, 1997 (33 sheets including both Spanish language version and English translation).

U.S. Patent Application 08.657,899.

Search Report for International Application No. PCT/US99/00343 mailed May 3, 1999.

Patent Abstracts of Japan for Publication No. 04281802, published Oct. 7, 1992.

First Written Opnion, Application No. PCT/US99/00343, mailed Nov. 17, 1999.

*Primary Examiner*—Tom Dunn
*Assistant Examiner*—Cynthia M Donley
*Attorney, Agent, or Firm*—Conley, Rose & Tayon, PC

[57] ABSTRACT

Contaminated adsorbent particles, preferably activated carbon particles, are regenerated in water at supercritical conditions. The particles are preferably mixed in water prior to treatment. The mixture is preferably heated to a temperature at least about 900° F. (482° C.) and pressurized to a pressure sufficient to achieve supercritical conditions for water. The mixture is preferably flowed through a first reactor for a time sufficient to substantially remove the organic contaminants from the particles. The particles are separated from the water and the mixture of water and organic contaminants may be transferred to a second reactor. Within the second reactor the organic contaminants are preferably substantially oxidized by supercritical water oxidation.

67 Claims, 7 Drawing Sheets

U.S. PATENT DOCUMENTS

| | | |
|---|---|---|
| 4,749,492 | 6/1988 | Berrigan, Jr. et al. . |
| 4,784,672 | 11/1988 | Sircar . |
| 4,792,408 | 12/1988 | Titmas . |
| 4,797,524 | 1/1989 | Moret et al. . |
| 4,822,394 | 4/1989 | Zeigler et al. . |
| 4,822,497 | 4/1989 | Hong et al. . |
| 4,861,497 | 8/1989 | Welch et al. . |
| 4,891,139 | 1/1990 | Zeigler et al. . |
| 4,898,107 | 2/1990 | Dickinson . |
| 4,957,721 | 9/1990 | Lonsinger et al. . |
| 4,983,296 | 1/1991 | McMahon et al. . |
| 5,011,614 | 4/1991 | Gresser et al. . |
| 5,013,698 | 5/1991 | Lonsinger et al. . |
| 5,053,142 | 10/1991 | Sorensen et al. . |
| 5,057,231 | 10/1991 | Mueller et al. . |
| 5,106,513 | 4/1992 | Hong . |
| 5,124,292 | 6/1992 | Larsen et al. . |
| 5,133,877 | 7/1992 | Rofer et al. . |
| 5,183,577 | 2/1993 | Lehmann . |
| 5,192,453 | 3/1993 | Keckler et al. . |
| 5,198,398 | 3/1993 | van Duijn . |
| 5,221,486 | 6/1993 | Fassbender et al. . |
| 5,230,872 | 7/1993 | Tiggelbeck et al. . |
| 5,232,604 | 8/1993 | Swallow et al. . |
| 5,232,605 | 8/1993 | Baur et al. . |
| 5,240,619 | 8/1993 | Copa et al. . |
| 5,250,193 | 10/1993 | Sawicki et al. . |
| 5,252,224 | 10/1993 | Modell et al. . |
| 5,266,540 | 11/1993 | Menicagli et al. . |
| 5,358,646 | 10/1994 | Gloyna et al. ............................ 210/762 |
| 5,367,147 | 11/1994 | Kim et al. . |
| 5,405,533 | 4/1995 | Hazlebeck et al. . |
| 5,405,812 | 4/1995 | Bruggendick . |
| 5,551,472 | 9/1996 | McBrayer, Jr. et al. . |
| 5,552,039 | 9/1996 | McBrayer, Jr. et al. . |
| 5,582,715 | 12/1996 | McBrayer, Jr. et al. . |
| 5,591,415 | 1/1997 | Dassel et al. . |
| 5,607,595 | 3/1997 | Hiasa et al. . |
| 5,620,606 | 4/1997 | McBrayer, Jr. et al. . |
| 5,628,819 | 5/1997 | Mestemaker et al. . |
| 5,630,434 | 5/1997 | Gray et al. . |
| 5,755,974 | 5/1998 | McBrayer, Jr. et al. . |
| 5,770,174 | 6/1998 | Eller et al. . |

SUPERCRITICAL TREATMENT OF ADSORBENT MATERIALS

BACKGROUND OF THE INVENTION

1. Field of the Invention

This invention generally relates to the regeneration of adsorbent materials in a supercritical water medium. More particularly, the invention relates to the regeneration of the adsorptive capacity of activated carbon particles using supercritical water. Additionally, the invention relates to a process and apparatus for removing organic contaminants from activated carbon particles and for oxidizing the organic contaminants.

2. Description of the Related Art

The use of water and air streams during a variety of industrial processes tends to produce effluent streams contaminated with impurities. These impurities typically include both volatile and non-volatile organic compounds. Potable water (i.e., drinking water) may also become contaminated with organic contaminants. Before these contaminated streams may be used the organic impurities are typically removed. The removal of these impurities may be accomplished by the use of adsorbent particles. Activated carbon is a common adsorbent that tends to be used to purify contaminated effluent streams.

In a typical adsorptive process activated carbon particles are formed into a bed. Typically, granular activated carbon (GAC) having an average size greater than about 0.25 mm is used to form the bed. The contaminated stream to be treated is passed through the bed. Impurities in the stream tend to adhere to the surface of the activated carbon particles and become trapped within the pores of the activated carbon particles. Eventually, the activated carbon particles may become saturated with these impurities. When the activated carbon particles become saturated in this manner the adsorptive capacity of the activated carbon particles is reached and the particles may no longer remove impurities from the fluid stream. The activated carbon particles may then be replaced by unused activated carbon particles, or the activated carbon particles may be regenerated and reused.

Activated carbon particles (PAC) having an average size of less than 150 μm may also be used to purify contaminated fluid streams. The activated carbon particles are typically suspended in the stream for a time sufficient to allow removal of the organic contaminates from the stream. Eventually the particles become saturated with impurities such that the particles may no longer remove impurities from the fluid stream. It is usually more economical to regenerate and reuse activated carbon particles rather than replace activated carbon particles with new material. The regeneration of activated carbon particles, especially GAC, involves the removal of the adsorbed impurities from the activated carbon. A typical method of regenerating activated carbon particles involves a series of heating steps. Initially, the activated carbon particles are dried. The dried activated carbon particles may undergo a thermal desorption step in which they are heated to temperatures from about 100° C. to about 400° C. A pyrolysis of any remaining organics may then be accomplished by heating the activated carbon particles to temperatures from about 200° C. to about 650° C. Finally, the pyrolysis residues remaining from the adsorbed organics are gasified by treatment with water, carbon dioxide and oxygen at a temperature greater than about 650° C.

This high temperature purification process tends to cause the adsorbed impurities to vaporize and pass from the activated carbon particles. Heating in air or any sort of oxidizing atmosphere, however, may cause partial combustion of the activated carbon particles. This combustion may lead to an increase in the size of the pores in the activated carbon particles. As a result, the heat-regenerated activated carbon particles tend to have a lower adsorptive capacity.

In general, a heat process as described above, may only be used on granular activated carbon particles. This makes the process less applicable to activated carbon particles having an average size of less than about 150 μm. Additionally, this type of process typically requires a large amount of energy in order to sustain the required temperatures throughout a continuous process. Finally, the equipment involved to run this type of process may prevent on site purification of activated carbon particles. This may require the transportation of contaminated activated carbon particles to a central recycling site. The transportation of the particles to and from a central recycling site tends to add to the cost of recycling the activated carbon particles.

Steam regeneration has also been used to partially regenerate the adsorptive capacity of activated carbon particles. Steam regeneration is typically effective in removing only a portion of the adsorbed impurities, leaving behind a substantial amount of non-volatile organic impurities (i.e., organic compounds with relatively high boiling points) adsorbed onto the activated carbon particles. Superheated steam (e.g., steam at temperatures approaching 300 to 500° F. (150 to 260° C.)) may also be used to partially regenerate the adsorptive capacity of activated carbon particles. Superheated steam tends to remove a greater portion of the adsorbed impurities, but also tends to leave impurities adsorbed upon the activated carbon particles. The impurities left adsorbed upon the activated carbon particles may be removed by further heating of the activated carbon under vacuum conditions. The use of steam for regenerating activated carbon particles will typically produce a substantial amount of water contaminated with organics. The impurities within this water usually need to be removed prior to introducing the water back into the environment.

A process which avoids some of these problems involves the use of a wet oxidation procedure, as described in U.S. Pat. No. 4,749,492 to Berrigan, Jr. et al. An aqueous mixture of activated carbon particles is treated with an oxidant at a temperature of about 475° F. (245° C.) and a pressure of about 900 psig. (62 bar). During this treatment a portion of the organic contaminants may be removed from the activated carbon particles. At the temperature and pressure of the reactor a portion of the organic contaminants may be oxidized such that the organic contaminants are no longer adsorbed by the activated carbon particles. The oxidized organic contaminants in the aqueous phase are separated from the activated carbon particles and the particles may be reused. Under the strong oxidizing conditions of such a process a substantial amount of the activated carbon particles tend to be oxidized. The oxidation of the activated carbon particles tends to lower the adsorptive capacity of the regenerated activated carbon.

It would therefore be desirable to have a more efficient process and apparatus by which impurities could effectively be removed or extracted from activated carbon particles with less degradation of the activated carbon. The process and apparatus would also optimally address the disposal and/or destruction of the separated organic contaminants.

SUMMARY OF THE INVENTION

This invention generally relates to methods and apparatus for regenerating the adsorptive capabilities of adsorbent particles by treatment with supercritical water. More particularly, an embodiment of the invention relates to regeneration of the adsorptive capacity of activated carbon particles using supercritical water. Additionally, an embodiment of the invention relates to a combined process and apparatus for removing organic contaminants from the activated carbon and for oxidizing the removed organic contaminants.

The treatment of contaminated adsorbent particles with water in a reactor at supercritical conditions may substantially remove the organic contaminants from the adsorbent particles. A variety of adsorbent particles may be treated in this manner, including but not limited to activated carbon, alumina, and/or silica. More preferably, activated carbon is regenerated under these conditions. Typically the organic contaminants include a variety of organic compounds that have been adsorbed by the adsorbent particles. Release of these organic contaminants may allow the adsorbent to be reused. When treated with water at supercritical conditions the organic contaminants may be substantially removed from the adsorbent materials. In order to prevent re-adsorption of the removed organic contaminants by the adsorbents, the adsorbents are preferably separated from the water while the water is at supercritical conditions. If the water is cooled prior to this separation the organic contaminants may be re-adsorbed onto the adsorbent.

An embodiment of a method for the removal of organic contaminants from activated carbon is described. This method is preferably continuous. While the method is described for activated carbon particles, it should be understood that a variety of other adsorbent particles may be treated in a similar manner including but not limited to alumina and silica adsorbents. Activated carbon particles contaminated with organic contaminants are preferably mixed with water such that a suspension of the particles within water is formed. The mixture is preferably conducted to a first reactor. Within the first reactor the suspension is preferably heated to a temperature of at least about 900° F. (482° C.) and a pressure of at least about 3200 psig. (220 bar). This temperature, at least about 200° F. (111° C.) over the critical temperature of water, was found to be optimal to achieve an effective separation of the organic contaminants from the activated carbon particles.

The mixture of activated carbon particles and water is preferably passed through the first reactor for a time sufficient to transfer substantially all of the organic contaminants from the adsorbent particles to the supercritical water. To prevent readsorption of the organic contaminants by the activated carbon particles, the mixture of particles in water is conducted to a separator, while maintaining the mixture at supercritical conditions for water. The separator preferably affects the separation of the activated carbon particles from the water at a temperature of at least about 900° F. (482° C.) and a pressure above about 3200 psig. (220 bar) during the separation. During this separation the activated carbon particles are preferably removed from the water, while the organic contaminants remain in the water. The purified activated carbon particles may be collected in a collection vessel while the mixture of water and organic contaminants is transferred out of the separator.

More preferably, the activated carbon particles are collected using two collection vessels. During the separation of the activated carbon particles from the water the particles are preferably transferred into the first collection vessel while at a temperature and pressure in the vicinity of supercritical conditions for water. As more activated carbon particles are collected within the first collection vessel, it may become necessary to remove the particles from the first collection vessel. After the first collection vessel is substantially filled, the collected activated carbon particles are preferably transferred to the second collection vessel. The first vessel is preferably isolated from the system, depressurized and cooled. After the first collection vessel is emptied of the activated carbon particles, the first collection vessel is preferably re-pressurized and hooked up to the system so that the second collection vessel may be emptied. The use of two collection vessel may allow a continuous process for the purification of activated carbon particles to be achieved.

The mixture of water and organic contaminants is preferably transferred to a second reactor. As the mixture of water and organic contaminants are transferred to the second reactor an oxidant may be added to the mixture. The oxidant may be added to the mixture to promote the oxidation of the organic contaminants. The mixture of water and organic contaminants is preferably kept within the second reactor for a time sufficient to allow substantially all of the organic contaminants to become oxidized.

In another embodiment, the contaminated activated carbon particles may be placed within the first reactor prior to treatment with supercritical water. The first reactor is preferably configured such that the passage of activated carbon particles through the first reactor is inhibited. A system such as a retaining filters system may be used to inhibit the passage of the activated carbon particles through the first reactor. A stream of water at supercritical conditions is passed through the first reactor and the activated carbon particles contained therein. The stream of water is preferably kept at a temperature of at least about 900° F. (482° C.) and a pressure above about 3200 psig. (220 bar).

The stream of water at supercritical conditions is preferably passed through the first reactor containing the activated carbon particles for a time sufficient to substantially remove the organic contaminants from the activated carbon particles. After the organic contaminants have been substantially removed from the activated carbon particles the first reactor is isolated from the system and the regenerated activated carbon particles are preferably removed from the first reactor. Additional contaminated particles may then be added to the first reactor and the above-described process repeated.

The mixture of water and organic contaminants is preferably transferred to a second reactor. As the mixture of water and organic contaminants are transferred to the second reactor an oxidant may be added to the mixture. The oxidant may be added to the mixture to promote oxidation of the organic contaminants. The mixture of water and organic contaminants is preferably kept within the second reactor for a time sufficient to allow substantially all of the organic contaminants to become oxidized.

In another embodiment, a continuous countercurrent extractor may be used to remove the organic contaminants from the activated carbon particles. A water stream at supercritical conditions is preferably passed through a first reactor. The water stream is preferably kept at a temperature of at least about 900° F. (482° C.) and a pressure above about 3200 psig. (220 bar) as the stream is passed through the first reactor. The first reactor is preferably oriented substantially vertically such that the water stream flows from the lower portion of the reactor toward the upper portion of the reactor, i.e., in an upward direction.

Contaminated activated carbon particles are preferably heated and pressurized to the vicinity of supercritical conditions for water. The heated and pressurized activated carbon particles may then may be added to the upper portion of the first reactor while a water stream is being flowed through the reactor. The activated carbon particles are preferably conducted through the supercritical water flowing through the first reactor, the activated carbon particles moving from the upper portion of the reactor toward the lower portion of the reactor, i.e., in a downward direction. By adjusting the flow rate of the water stream the rate of movement of the activated carbon particles through the first reactor may also be adjusted. In this manner, the amount of time that the activated carbon particles are treated with the supercritical water may be adjusted such that the organic contaminants are substantially removed from the activated carbon particles prior to the particles leaving the first reactor.

After the activated carbon particles have been treated for a time sufficient to substantially remove the organic contaminants from the activated carbon particles, the particles are preferably conducted out of the lower portion of the first reactor and into a collection vessel. The supercritical water containing the separated organic contaminates preferably flows out of the upper portion of the first reactor and away from the activated carbon particles.

The mixture of water and organic contaminants is preferably transferred to a second reactor. As the mixture of water and organic contaminants are transferred to the second reactor an oxidant may be added to the mixture. The oxidant may be added to the mixture to promote oxidation of the organic contaminants. The mixture of water and organic contaminants is preferably kept within the second reactor for a time sufficient to allow substantially all of the organic contaminants to become oxidized.

An embodiment of a system for performing the previously described methods includes a first reactor, a separator, and a second reactor. A contaminated activated carbon supply source preferably supplies the contaminated activated carbon particles into the system such that a stream made of a mixture of contaminated activated carbon particles in water is formed. A pump and heater together preferably bring the stream to a temperature and pressure in the vicinity of supercritical conditions for water. The stream is preferably raised to the vicinity of supercritical conditions for water after the suspension of contaminated activated carbon particles in water has been formed.

The first reactor is preferably maintained at a temperature substantially above the temperature required to achieve supercritical conditions for water. The first reactor is preferably configured to maintain a temperature of at least about 900° F. (482° C.). The first reactor is preferably configured to maintain a pressure greater then about 3200 psig. (220 bar).

The separator may be a hydrocyclone separator or a sintered metal filter. The separator preferably operates at a temperature of at least about 900° F. (482° C.) and a pressure about 3200 psig. (220 bar). The separator is preferably configured to substantially separate the solid activated carbon particles from the water. The activated carbon particles that are separated within the separator may be passed from the separator into collection vessels via a lock hopper system. The activated carbon particles are preferably collected in at least two collection vessels. As one vessel is being filled the other vessel may be depressurized and emptied of the regenerated activated carbon particles. In this manner the regeneration procedure may be conducted as a continuous process.

After separation from the activated carbon particles, the mixture of water and organic contaminants is preferably transferred to a second reactor. After heating the mixture to the appropriate temperature an oxidant is preferably added to the mixture. The mixture of water, organic contaminants and oxidant is transferred to a second reactor. The second reactor is maintained at the vicinity of supercritical conditions for water. The mixture of water, organic contaminants and oxidant is preferably conducted through the second reactor for a time sufficient to ensure complete oxidation of the organic contaminants. The amount of oxidant mixed within the stream may be controlled to ensure substantially complete oxidation of the organic contaminants.

DETAILED DESCRIPTION OF THE PREFERRED EMBODIMENTS

The critical point of a solvent is the temperature and pressure above which the solvent cannot be liquefied by increasing the pressure. When heated above its critical temperature water attains a supercritical state in which the density of water drops to about 0.15 to 0.2 grams/cm$^3$. As used in this patent the term "supercritical water" is taken to mean water which is in this supercritical state. Supercritical water tends to have significantly different solubility properties than subcritical water. As used in this patent the term "subcritical water" is taken to mean water at a temperature and pressure below the critical point. Organic substances, which are normally substantially insoluble within subcritical water, tend to become highly soluble within supercritical water Alternatively, inorganic substances, which are typically soluble within subcritical water, tend to become substantially insoluble within supercritical water. This reversal of the dissolving properties of water may be effectively used in the regeneration of adsorbent materials.

As used in this patent, the term "supercritical conditions for water" is taken to mean a temperature higher than about 700° F. (370° C.) and a pressure higher than about 3200 psia. (220 bar). As used in this patent the term "vicinity of supercritical conditions for water" is taken to mean temperatures from about 550° F. (288° C.) to 1200° F. (650° C.) and pressures from about 2000 psia. (138 bar) to 5000 psia. (345 bar). As used in this patent the term "subcritical conditions for water" is taken to mean temperatures below about 700° F. (370° C.) and pressures below about 3200 psia. (220 bar).

Treatment of contaminated adsorbent particles with water in a reactor at supercritical conditions may substantially remove the organic contaminants from the adsorbent particles. A variety of adsorbent particles may be treated in this manner, including but not limited to activated carbon, alumina, and/or silica particles. More preferably, activated carbon particles are regenerated under these conditions. Typically, the contaminants include a variety of organic compounds that have been adsorbed onto the adsorbent particles. Removal of these organic contaminants from the adsorbent particles may allow the adsorbent particles to be reused. When treated with supercritical water, organic contaminants may be substantially removed from the adsorbent particles. In order to prevent re-adsorption of the removed organic contaminants by the adsorbent particles, the adsorbent particles are preferably separated from the water and organic contaminants while the mixture is at supercritical conditions for water. If the mixture drops to subcritical conditions for water, prior to separation of the adsorbent particles from the water, the organic contaminants may be re-adsorbed onto the adsorbent.

Figure 1:
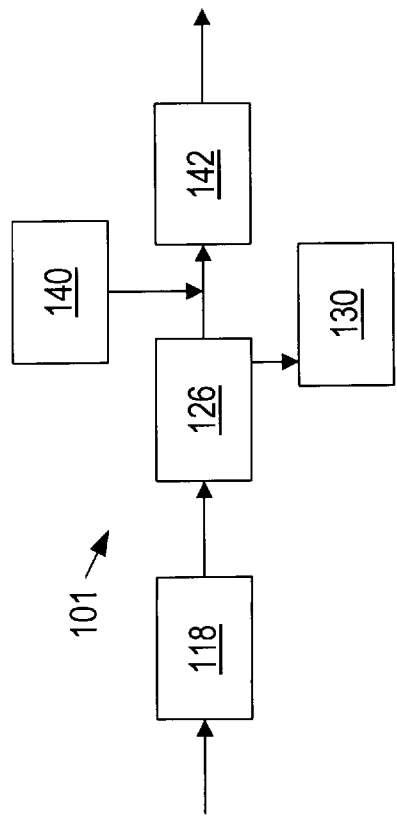
FIG. 1 depicts a block diagram illustrating a reactor assembly for regenerating the adsorptive capacity of adsorbent particles.

Referring to the simplified system 101 depicted in FIG. 1, an embodiment of a method for the removal of organic contaminants from activated carbon particles is described. While the method is described for activated carbon particles, it should be understood that a variety of other adsorbent particles may be treated in a similar manner, including but not limited to alumina and silica adsorbent particles. Activated carbon particles contaminated with organic compounds are preferably mixed with water such that a mixture of the activated carbon particles within the water is formed. The mixture of water and contaminated activated carbon particles preferably consists of up to about 25% by weight of contaminated activated carbon particles. The aqueous mixture of activated carbon particles is preferably heated and pressurized to a temperature and pressure that is at about supercritical conditions for water. The mixture is preferably introduced into a first reactor 118. Within the first reactor 118 the mixture is preferably heated to a temperature and a pressure sufficient to achieve supercritical conditions for water.

In another embodiment, the contaminated activated carbon particles may be introduced into a water stream that is substantially free of activated carbon particles while the stream is flowing through first reactor 118. A water stream is preferably heated to supercritical conditions for water prior to entering the first reactor 118. After the water stream is raised to supercritical conditions for water, the stream is preferably introduced into first reactor 118. Contaminated activated carbon particles are preferably added to the water stream while the water stream is passing through the first reactor 118.

In an embodiment the first reactor is maintained at a temperature of at least about 900° F. (482° C.) and a pressure of at least about 3200 psig. (220 bar). The temperature difference between the maintained reactor temperature and the critical temperature of water of about 200° F. (111° C.), was found to be necessary to achieve an effective separation of the organic contaminants from the activated carbon particles. At temperatures below 900° F. (482° C.), but above that required to achieve supercritical conditions for water, removal of the organic contaminants from the activated carbon particles tends to be significantly less effective. Thus to achieve efficient removal of the organic contaminants from the activated carbon particles, the process is preferably carried out at a temperature at least about 200° F. (111° C.) above the supercritical temperature of water (705.4° F., 374.1° C.). The pressure is kept at a value sufficient to achieve supercritical conditions for water, typically at or above about 3200 psig (220 bar).

While in first reactor 118 the organic contaminants are preferably removed from the activated carbon particles. It is known that at subcritical conditions organic compounds tend to be only slightly soluble in water. When subcritical water containing organic compounds is contacted with activated carbon particles, the activated carbon particles may attract and adsorb the organic compounds onto their surface. This process of removing organic compounds from the water may be aided, in part, by the low solubility of the organic compounds in the subcritical water. By treating activated carbon particles contaminated with organic compounds in supercritical water, the process of adsorption may be reversed. The increased solubility of the organic compounds in the supercritical water may allow the organic contaminants to remain in the water rather than become re-adsorbed by the activated carbon particles. As long as the water remains in this supercritical state, the organic compounds may remain substantially dissolved within the water. As the temperature and pressure of the mixture is dropped below supercritical conditions for water the organic contaminants may become re-adsorbed by the activated carbon.

In a standard supercritical water oxidation procedure, an oxidant is typically added to the water stream to ensure complete oxidation of the organic material. Contrary to this common practice, the concentration of oxidant within the mixture of activated carbon particles in water is preferably minimized prior to entry of this mixture into the first reactor 118. It is well known that adsorbent particles, especially activated carbon particles, will react with oxidants at high temperatures and pressures to form oxidation products. Oxidation of activated carbon particles will tend to cause a decrease in the mechanical strength of the activated carbon particles. Thus the presence of oxidants is preferably minimized as much as possible before treatment of activated carbon particles with supercritical water within the first reactor 118. When possible, all potential oxidants are preferably removed prior to treatment of activated carbon particles with supercritical water.

The mixture of activated carbon particles and water is preferably passed through the first reactor 118 for a time sufficient to remove substantially all of the organic contaminants from the adsorbent particles. During this time, the organic contaminants are preferably separated from the activated carbon particles and substantially dissolved within the water. To prevent re-adsorption of the organic contaminants by the activated carbon particles, the mixture is preferably conducted to a separator 126 while maintaining the mixture at supercritical conditions for water. The separator 126 preferably affects the separation of the activated carbon particles from the water at a temperature and pressure sufficient to maintain the supercritical water conditions of the incoming mixture. During this separation, the activated carbon particles are preferably removed from the water, while a substantial portion of the organic contaminants remain in the water. Preferably, the mixture of activated carbon particles and water is kept at a temperature of at least about 900° F. (482° C.) and a pressure above about 3200 psig. (220 bar) during the separation. The purified activated carbon particles may be collected while the mixture of water and organic contaminants is transferred out of the separator 126.

The activated carbon particles are preferably collected in the collection vessel 130. During the separation of the activated carbon particles from the water, the particles are preferably transferred into the collection vessel 130 while at a temperature and pressure in the vicinity of supercritical conditions for water. As more activated carbon particles are collected within collection vessel 130, it may become necessary to remove the particles from the collection vessel to prevent overfilling of the collection vessel. This may be accomplished by stopping the regeneration process and isolating the collection vessel 130 from the system 101. After the collection vessel is isolated from the system 101, the collection vessel is preferably depressurized and cooled. Removal of the activated carbon particles from the collection vessel 130 may be performed and the emptied collection vessel reattached to the system 101.

More preferably, the activated carbon particles are collected using two collection vessels. During the separation of the activated carbon particles from the water the particles are preferably transferred into the first collection vessel while at a temperature and pressure in the vicinity of supercritical conditions for water. As more activated carbon particles are collected within the first collection vessel, it may become necessary to remove the particles from the first collection vessel. After the first collection vessel is substantially filled, the collected activated carbon particles are preferably transferred to the second collection vessel. The first vessel may then be isolated from the system, depressurized and cooled. After the first collection vessel is emptied of the activated carbon particles, the first collection vessel is preferably re-pressurized and reconnected to the system so that the second collection vessel may be emptied. The use of two collection vessels may allow a continuous process for the purification of activated carbon particles to be achieved.

The mixture of water and organic contaminants is preferably transferred to a second reactor 142. The water is preferably maintained at a temperature and pressure at least about the vicinity of supercritical water. As the mixture of water and organic contaminants is transferred to the second reactor 142 an oxidant may be added to the mixture from oxidant source 140. The oxidant may be added to the mixture to promote oxidation of the organic contaminants. The mixture of water and organic contaminants is preferably kept within the second reactor 142 for a time sufficient to allow substantially all of the organic contaminants to become oxidized.

The use of two reactors as described above offers a number of advantages over conventional practices. The first reactor 118 is preferably configured to remove the organic contaminants from activated carbon particles without destroying the adsorptive capacity of these particles. The removal of the organic contaminants from activated carbon particles is preferably accomplished by treating the contaminated activated carbon particles with supercritical water under conditions in which the amount of oxidant present is inhibited and/or minimized. The use of a second reactor 142 allows the mixture of water and organic contaminants, produced after the separation of the activated carbon particles from the water, to be treated with supercritical water under oxidizing conditions. The activated carbon particles are therefore only subjected to a minimal amount of oxidizing conditions during the procedure. In this manner, the regeneration of the activated carbon and the oxidation of the organic contaminants may be accomplished in a single process.

In another embodiment, the contaminated activated carbon particles may be placed within the first reactor 118 prior to treatment with supercritical water. The first reactor 118 may be configured such that the passage of activated carbon particles through the first reactor is inhibited. A retaining filter or a system of retaining filters may be used to inhibit the passage of the activated carbon particles through first reactor 118. A stream of water at supercritical conditions may be passed through activated carbon particles retained within first reactor 118. The stream of water is preferably kept at a temperature of at least about 900° F. (482° C.) and a pressure above about 3200 psig. (220 bar).

The stream of water at supercritical conditions is preferably passed through the first reactor containing the activated carbon particles for a time sufficient to remove at least a substantial portion of the organic contaminants from the activated carbon particles. The time needed to purify the activated carbon particles is preferably predetermined by running a series of experiments prior to operation of the system. During these experiments water at supercritical conditions is preferably passed through the activated carbon particles for various time intervals and the purity of the activated carbon particles is tested. During the treatment process this time may be used to determine when the activated carbon particles are substantially purified.

In another embodiment, the time required to achieve removal of the organic contaminants from the activated carbon particles may be determined by monitoring the ultraviolet absorption of the effluent stream. Since most organic compounds exhibit significant ultraviolet absorption, monitoring the ultraviolet absorption of the effluent stream may give a measurement of the concentration of organic contaminants in the effluent stream. As the supercritical water is passed through the activated carbon particles, the water preferably removes a portion of the organic contaminants from the particles and out of the reactor. During the initial passage of supercritical water through the activated carbon particles the concentration of organic contaminants within the water may be at its highest. Thereafter the concentration may steadily drop as less organic contaminants remain adsorbed on the activated carbon particles. As the concentration of organic contaminants within the effluent stream becomes lower the ultraviolet absorption of the stream may also drop. When the concentration of organic contaminants within the effluent reaches a sufficiently low level, as determined by ultraviolet absorption of the effluent stream, the stream of supercritical water is preferably stopped.

In another embodiment, the concentration of organic contaminants within the effluent stream may be monitored by measuring the refractive index of the effluent stream. The measurement of the refractive index of the solution may be used when the organic contaminants do not exhibit significant ultraviolet absorption. Preferably, both the refractive index and the ultraviolet absorption of the effluent stream is measured to determine the concentration of organic contaminants within the stream.

Alternatively, the concentration of organic contaminants may in the effluent stream may be monitored by determining the TOC of a slip stream emanating from the effluent stream. A combination of measuring the ultraviolet absorption, refractive index and/or the TOC of the slip stream may be used to determine the concentration of organic contaminants in the effluent stream.

After a substantial portion of the organic contaminants have been removed from the activated carbon particles, the first reactor may be isolated from the system and the regenerated activated carbon particles removed from the first reactor. Additional contaminated activated carbon particles may then be added to the first reactor and the above-described process repeated.

The effluent water stream emanating from the first reactor is preferably fed into a second reactor. The effluent water stream, which includes the organic contaminants, is preferably maintained at a temperature and pressure at least about the vicinity of supercritical water. As the effluent water stream is transferred to the second reactor an oxidant is preferably added to the stream. The oxidant may be added to the effluent water stream to help promote the complete oxidation of the organic contaminants. The effluent water stream is preferably kept within the second reactor for a time sufficient to allow at least a substantial portion, or, more preferably, substantially all of the organic contaminants to become oxidized.

In this batch method the use of a separator, as described in the previous embodiment, may be avoided. Additionally the time that the activated carbon particles remain in contact with the supercritical water may be easily controlled. Determination of this time may be readily accomplished since the concentration of impurities within the effluent may be monitored throughout the process. The use of two reactors may allow the regeneration of the activated carbon and the disposal of the organic contaminants to be accomplished in a single process.

Figure 2:
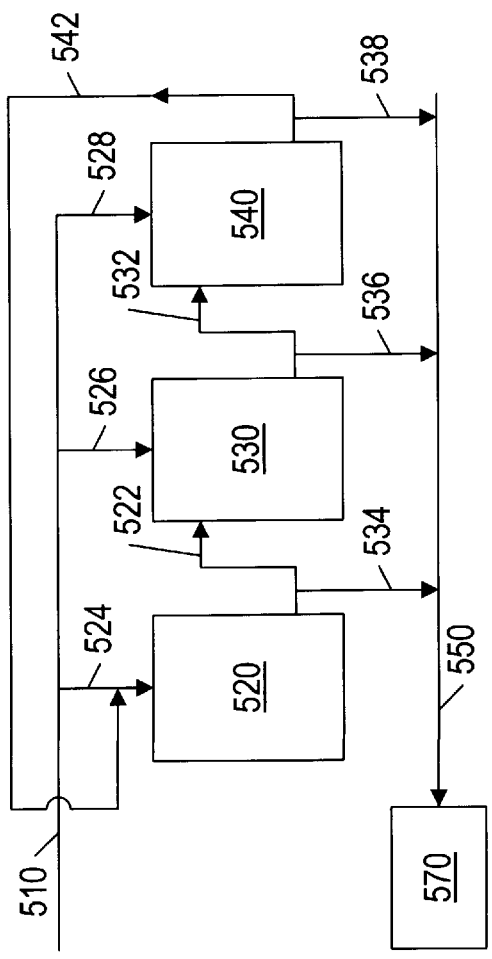
FIG. 2 depicts a block diagram of three reactors linked together as part of a continuous batch process for regenerating the adsorptive capacity of adsorbent particles.

In another embodiment, the contaminated activated carbon particles may be placed within a series of reactors 520, 530, and 540, as depicted in FIG. 2, prior to treatment with supercritical water. All of the reactors may be configured such that passage of activated carbon particles through the reactors is inhibited.

Preferably, the reactors are configured such that the supercritical water flows from an upper portion of the reactor toward a lower portion of the reactor, i.e., in a downward direction. A retaining filter or a system of retaining filters may be positioned in the lower portion of the reactors such that the passage of activated carbon particles in a downward direction is inhibited. When introducing contaminated activated carbon particles to the reactors the particles are preferably mixed in water and introduced into the top of the reactor. When the mixture of water and activated carbon particles reaches the lower portion of the reactor the retaining filter may inhibit the passage of substantially all of the activated carbon particles through the reactor. The filters preferably allow the water to pass through the filters and out of the reactor. In this manner the reactors may be substantially filled with activated carbon particles prior to and/or during treatment with supercritical water.

In an embodiment, at least two reactors may be used to purify contaminated activated carbon particles. Preferably, at least three reactors 520, 530 and 540 are used, as depicted in FIG. 2. The reactors may be coupled to each other in a series arrangement. In this series arrangement, supercritical water may be passed through the first reactor 520 and into the second reactor 530 via conduit 522. The second reactor 530 is likewise configured such that supercritical water may pass through the second reactor 530 and into the third reactor 540 via conduit 532. The third reactor is preferably coupled to the first reactor to complete a loop, such that a stream of water may pass through the third reactor 540 and into the first reactor 520 via conduit 542.

In another embodiment, the reactors 520, 530, and 540 may be used in a parallel arrangement. In a parallel arrangement the supercritical water may enter the first reactor 520 via conduit 524. After passing through the first reactor 520 the water may be conducted out of the reactor and into conduit 534. Rather than entering the second reactor, as in the series arrangement described above, the water may be conducted into conduit 550 which leads to the oxidation reactor 570. In a similar manner supercritical water may enter reactor 530 via conduit 526. The water may be conducted through the second reactor 530 and into the conduit 550. Finally, the water may also be conducted through the third reactor, entering via conduit 528 and exiting via conduit 538. This arrangement may allow water to be passed through any combination of the reactors at the same time.

In both of the above described embodiments a plurality of valves may be positioned such that one or more of the reactors may be isolated from the system, i.e., the valves may be closed such that supercritical water may no longer pass through one or more of the reactors. The valves are preferably controlled by an automatic control system. The automatic control system (not shown) may control the opening and closing of the valves in response to time. Alternately, the automatic controller may control the flow of the water stream in response to the concentration of organic contaminants in the effluent stream from reactors 520, 530 and 540. By using either a parallel or series arrangement of reactors a continuous batch procedure may be used to purify the contaminated activated carbon particles.

In an embodiment of this procedure valves may be positioned such that supercritical water flows through reactor 520 and reactor 530, but is inhibited from flowing through reactor 540. While reactor 540 is isolated from the system, the activated carbon particles may be removed from the reactor and/or contaminated activated carbon particles may be added. This may allow supercritical water to continue purification of the activated carbon particles within reactors 530 and 540, while allowing removal and/or addition of activated carbon particles to the isolated reactor 540. Reactor 540 may then be reconnected to the system and either the first or the second reactor may be isolated from the system and the purified particles removed.

The effluent water stream emanating from the reactors is preferably fed into an oxidation reactor 570 via conduit 550. The effluent water stream, which includes the organic contaminants, is preferably maintained at a temperature and pressure at least about the vicinity of supercritical water. As the effluent water stream is transferred to the second reactor an oxidant is preferably added to the stream. The oxidant may be added to the effluent water stream to help promote the complete oxidation of the organic contaminants. The effluent water stream is preferably kept within the second reactor for a time sufficient to allow at least a substantial portion, or, more preferably, substantially all of the organic contaminants to become oxidized.

Figure 3:
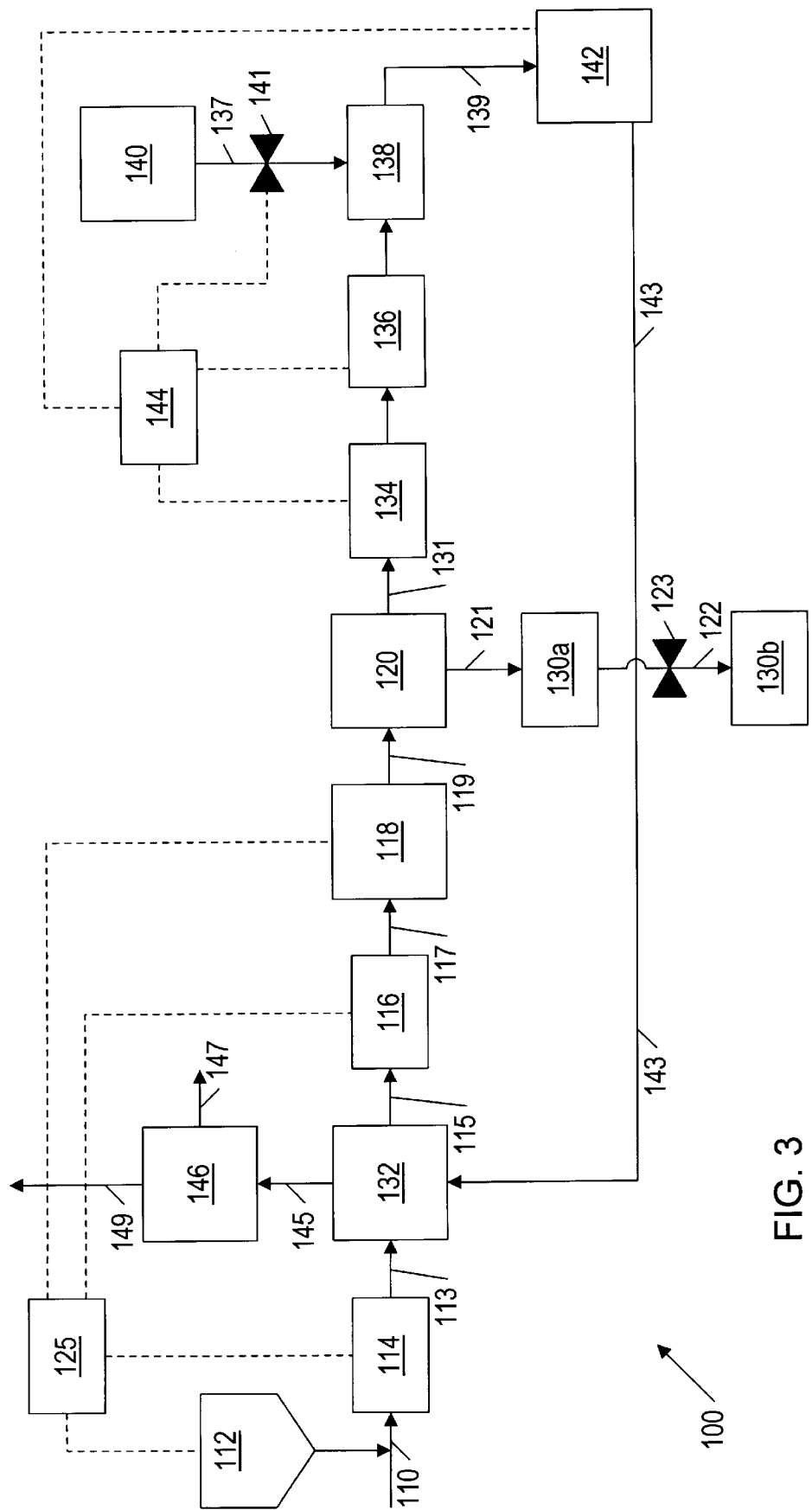
FIG. 3 depicts a more detailed block diagram of the reactor assembly depicted in FIG. 1.

An embodiment of a system for performing the previously described methods is presented in FIG. 3. A conduit 110 preferably conducts a water stream to the system 100. The water stream may be at a temperature substantially below the vicinity of supercritical conditions for water. A contaminated activated carbon supply source 112 is preferably connected to the conduit 110. The contaminated activated carbon supply source 112 preferably supplies contaminated activated carbon particles into the system 100. The contaminated activated carbon particles may be substantially dry. Alternatively, the activated carbon particles may be supplied in the form of a mixture in water. The activated carbon particles are preferably added to the water flowing through the conduit 110 such that a suspension of the activated carbon particles in water is formed. The suspension preferably consist of up to about 25% by weight of contaminated activated carbon particles. In one embodiment the contaminated activated carbon supply source 112 may include a "hopper" with a mixing unit to feed the activated carbon particles into the conduit 110.

The water stream made of a mixture of contaminated activated carbon particles in water is preferably conducted through conduit 110 to first pump 114, heat exchanger 132 and first heater 116. First pump 114, heat exchanger 132, and first heater 116 together preferably bring the stream to a temperature and pressure in the vicinity of supercritical conditions for water. A positive displacement pump is preferably used to pressurize the stream. A positive displacement pump is commercially available from Feluwa. The stream is brought to a pressure preferably in the range of about 2000 psig. to about 5000 psig. (138 bar to 345 bar), more preferably, above about 3200 psig. (220 bar)

Heat exchanger 132 may be used to preheat the water stream before it reaches the first heater 116. After the operation of the second reactor 142 has started, hot effluent coming out of the second reactor may be passed through the heat exchanger 132 via conduit 143. After passing through the heat exchanger 132 the stream is transferred to the first heater 116.

The first heater 116 may be used to heat the stream to temperatures in the vicinity of supercritical conditions. The first heater 116 is preferably a gas heater. First heater 116 preferably heats the water stream to a temperature between about 550° F. to about 1200° F. (290° C. to 650° C.), more preferably, in the range of about 700° F. to about 1000° F. (370° C. to 540° C.). The stream is preferably raised to the vicinity of supercritical conditions for water after the mixture of contaminated activated carbon particles in water has been formed. After the stream is raised to the vicinity of supercritical conditions for water the stream is preferably conducted through conduit 117 to first reactor 118.

In another embodiment, a previously formed mixture of contaminated activated carbon particles in water may be conducted into system 100 through conduit 110. Additional contaminated activated carbon particles may be introduced from supply source 112 into the stream to raise the concentration of activated carbon particles in the stream to up to about 25% by weight. The mixture of contaminated activated carbon particles in water is preferably conducted through conduit 110 to first pump 114, heat exchanger 132 and first heater 116. First pump 114, heat exchanger 132 and first heater 116 together preferably bring the stream to a temperature and pressure in the vicinity of supercritical conditions for water. After the stream is raised to the vicinity of supercritical conditions for water the stream is conducted through conduit 117 to first reactor 118.

The first reactor 118 is preferably configured to maintain a temperature and pressure in the vicinity of supercritical conditions for water. More preferably, the first reactor 118 is configured to maintain the water stream at a temperature substantially above the temperature required to achieve supercritical conditions for water. The first reactor is preferably maintained at a pressure greater then about 3200 psig. (220 bar). The first reactor is preferably maintained at a temperature of at least about 900° F. (482° C.).

The stream of contaminated activated carbon particles is preferably conducted through conduit 117 at a temperature in the vicinity of supercritical conditions for water to the first reactor 118. The first reactor 118 may be a substantially tubular reactor. A tubular reactor merely indicates that the diameter of the tubular reactor is considerably smaller than the length of the tubular reactor. The first reactor 118 may be designed to have a specific length to width ratio. This ratio is preferably chosen such that the stream flowing through the reactor at a constant flow rate resides within the reactor for a time sufficient to substantially remove the organic contaminants from the activated carbon.

A controller 125 or set of controllers may control the amount of activated carbon added to the water stream by the activated carbon supply source 112. The controller 125 may be a computer, programmable logic controller, or any of other known controller systems known in the art. The controller 125 also preferably adjusts the flow rate of the mixture of contaminated activated carbon particles and water through the first reactor 118. The flow rate of this mixture may be adjusted by altering the pump displacement of the first pump 114. The controller may send signals to the first pump 114 to control the pump displacement, thereby controlling the flow rate of the stream. The flow rate is preferably adjusted such that the activated carbon particles are treated within the first reactor 118 for a sufficient time to allow the organic contaminants to be substantially removed. The controller 125 may additionally be programmed to maintain the first reactor 118 at the desired temperature and pressure. The controller 125 may adjust the temperature of first heater 116 and/or the amount of pressure produced by first pump 114 in response to changes in temperature and pressure from the first reactor 118.

Conduit 119 preferably conducts the treated suspension of activated carbon particles and water from the first reactor 118 into a separator 120. The separator 120 may be a hydrocyclone separator or a gravity separator. Alternatively, the separator 120 may include a filter system for separating the activated carbon particles from the stream. The conduit 119 and separator 120 preferably operate at the vicinity of supercritical conditions for water. More preferably, the conduit 119 and separator 120 maintain conditions at a temperature of at least about 900° F. (482° C.) and a pressure greater than about 3200 psig. (220 bar). By maintaining these conditions the organic contaminants may be prevented from becoming re-adsorbed onto the activated carbon particles. The separator 120 is configured to substantially separate the activated carbon particles from the water. The organic contaminants preferably remain in the water stream during this separation. At supercritical conditions the organic contaminants are typically substantially more soluble in the aqueous phase and tend to remain within the aqueous phase during the separation procedure.

The activated carbon particles that are separated within the separator 120 may be passed from the separator 120 into collection vessels 130a and 130b. The activated carbon particles are preferably collected while the separator 120 remains in the vicinity of supercritical conditions. The collection vessels 130a and 130b may be joined to each other by conduit 122, with collection valve 123 positioned between the two collection vessels. The first collection vessel 130a may be a lock hopper system. The separated activated carbon particles are preferably conducted from the separator 120 to the first collection vessel 130a via conduit 121. Initially, the activated carbon particles may flow through the first collection vessel 130a and into the second collection vessel 130b. As the second collection vessel becomes substantially filled with activated carbon particles the collection valve 123 is preferably closed such that the second collection vessel 130b is isolated from the first collection vessel 130a. Collection valve 123 may prevent the activated carbon particles from entering the second collection vessel 130b. The second collection vessel 130b may be removed and emptied of activated carbon particles while the valve 123 is closed. While the activated carbon particles are being removed from the second collection vessel 130*b*, the activated carbon particles from the separator 120 are preferably collected in the first collection vessel 130*a*. After the second collection vessel 130*b* is emptied of the activated carbon particles, the second collection vessel 130*b* is preferably reconnected to the system 100. The collected activated carbon particles contained within the first vessel 130*a* are preferably transferred to the second vessel 130*b* by opening valve 123. Subsequently, separated activated carbon particles are preferably transferred from the separator 120 through the first collection vessel 130*a* and into the second collection vessel 130*b*. This procedure is repeated during the regeneration procedure such that the procedure may be conducted as a continuous process.

Figure 4:
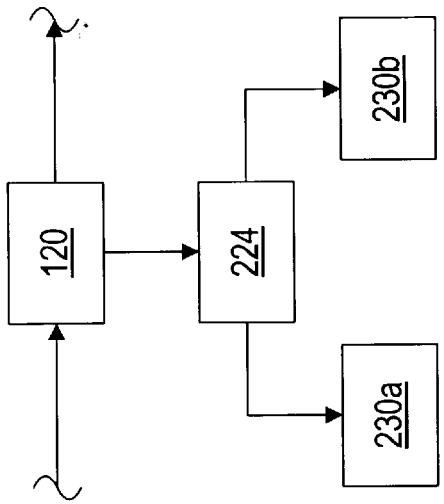
FIG. 4 depicts an activated carbon particle collection system.

FIG. 4 depicts another embodiment in which the activated carbon particles that are separated within the separator 120 may be passed from the separator 120 into collection vessels 230*a* and 230*b* via the collector switch 224. Collector switch 224 may be a lock hopper system. The activated carbon particles are preferably collected while the separator 120 remains in the vicinity of supercritical conditions. The collector switch 224 is preferably configured to control the flow of particles from the separator 120 to the collection vessels 230*a* and 230*b*. The particles are preferably alternately collected between the two collection vessels 230*a* and 230*b*. As one vessel is being filled, e.g., 230*a*, the other vessel, e.g., 230*b*, may be depressurized and emptied of the regenerated activated carbon particles. This procedure may be repeated during the regeneration procedure such that the procedure is performed as a continuous process.

After separation from the activated carbon particles, the mixture of water and organic contaminants is preferably transferred to a second reactor 142, where the organic contaminants may be substantially oxidized. Conduit 131 is preferably connected to the separator 120 such that the mixture is first transferred to a second pump 134. The second pump 134 preferably brings the mixture to a pressure in the vicinity of supercritical conditions for water.

After the mixture of water and organic contaminants has been pressurized by the second pump, the mixture may be passed through heating/cooling unit 136. Depending on the concentration of organic contaminants within the mixture, the temperature of the mixture may need to be raised or lowered before the mixture is treated in the second reactor 142. If the concentration of organic contaminants is low, the mixture is preferably heated to a temperature in the vicinity of supercritical conditions. Alternatively, if the concentration of organic contaminants is high the mixture may need to be cooled prior to entering the second reactor 142.

The supercritical water oxidation of organic compounds is typically an exothermic reaction, i.e., a chemical reaction that produces heat. This production of heat during the oxidation of organic compounds may cause the temperature of the surroundings to rise. In a supercritical water reactor, the exothermic oxidation of organic compounds may cause the temperature of the water to rise to a temperature which may damage the second reactor. This rise in temperature tends to be directly related to the concentration of organic compounds within the reactor.

If a low concentration of organic compounds is present the temperature rise may be small. Thus when the concentration of organic compounds is low, the mixture may be heated prior to beginning the oxidation reaction. The mixture is preheated since the heat produced by the oxidation of the organic compounds may be insufficient to maintain a temperature sufficient to attain supercritical water conditions within the reactor.

Alternatively, if a high concentration of organic compounds is present, the rise in temperature may be difficult to control if the initial temperature of the stream is too high. Thus, when the concentration of organic compounds is high it is desirable that the temperature of the water be lowered in anticipation of the increase in temperature produced by the oxidation reaction.

After heating/cooling the contaminated water stream to the appropriate temperature the water stream is fed to mixer 138, where it may be mixed with oxidant from oxidant feeder 140 through oxidant feeder line 137. An oxidant feeder valve 141 may be used to control the amount of oxidant added to the water stream. The oxidant may be any conventional source of oxygen. Examples of oxygen sources include, but are not limited to liquid oxygen, air, hydrogen peroxide, ozone, persulfates, permanganates, nitrates and their corresponding acids, oxyacids of chlorine and their corresponding salts, hypochlorites, chlorus acid and chlorites, chlorates, perchlorates, and their corresponding acids. Mixtures of oxidants may be used in substantial or even catalytic quantities. Preferably liquid oxygen, hydrogen peroxide and/or mixtures thereof are preferred.

The mixture of water, organic contaminants and oxidant is transferred to the second reactor 142 through conduit 139. The second reactor 142 is preferably configured to maintain reactor conditions in the vicinity of supercritical conditions for water. More preferably, the second reactor 142 is configured to maintain reactor conditions at supercritical conditions for water. The mixture is preferably conducted through the second reactor for a time sufficient to ensure substantially complete oxidation (i.e., greater than 99% oxidation) of the organic contaminants contained therein. The amount of oxidant mixed within the mixture may be controlled by second controller 144 via oxidant feeder valve 141 to ensure substantially complete oxidation of the organic contaminants.

Controller 144 may be a computer, programmable logic controller, or any of other known controller systems known in the art. The controller 144 preferably adjusts the flow rate of the mixture of organic contaminants and water through the second reactor 142. The flow rate of this mixture may be adjusted by altering the pump displacement or speed of the second pump 134. The controller may send signals to the second pump 134 to control the flow rate of the mixture. The flow rate is preferably adjusted such that the organic contaminants are treated within the second reactor 142 for a sufficient time to allow the organic contaminants to be substantially oxidized. The controller 144 may additionally be configured to maintain the second reactor 142 at a temperature and pressure at least about supercritical conditions for water. The controller 144 may adjust the temperature of the mixture with heater/cooler 136 and/or the pump displacement or speed of second pump 134 in response to changes in temperature and pressure from the second reactor 142. Additionally, the controller 144 may adjust the amount of oxidant added to the mixture in mixer 138 by controlling the oxidant feeder valve 141. The amount of oxidant added is preferably controlled in response to changes in temperature and pressure of the second reactor 142.

After passing through the second reactor the effluent stream is preferably conducted to heat exchanger 132 through conduit 143. Heat exchanger 132 preferably allows the effluent stream from the second reactor 142 to pass through in such a way that the heat from the effluent stream will preheat the mixture of water and organic contaminants passing through conduits 113 and 115. The effluent stream may then be transferred to cooler 146 via conduit 145 Cooler 146 preferably lowers the temperature and pressure of the effluent water stream to sub-critical conditions. Gases are preferably released to the atmosphere through conduit 149. Condensed water is preferably transferred from the system 100 through conduit 147.

Figure 5:
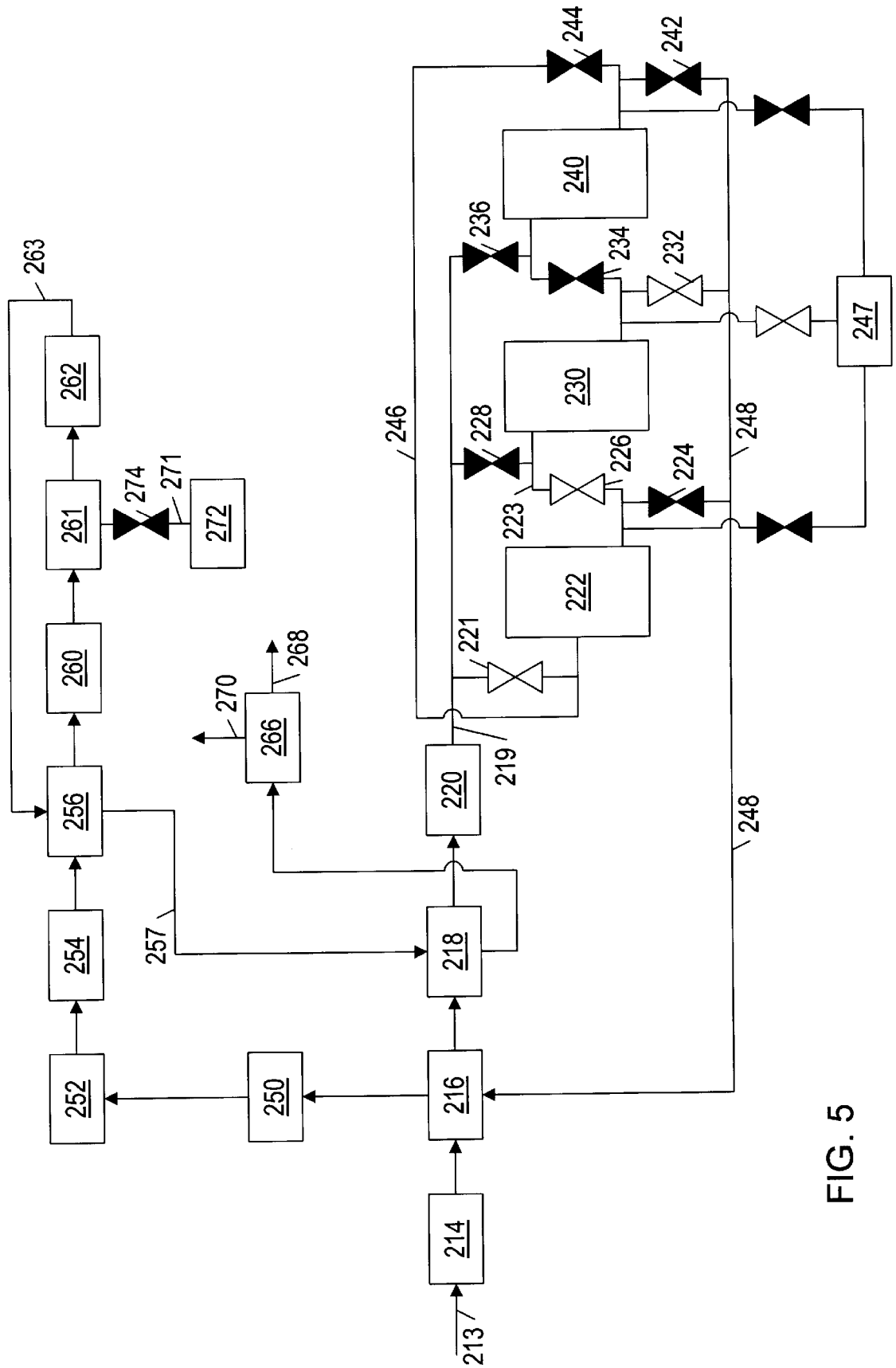
FIG. 5 depicts a system for regenerating the adsorptive capacity of adsorbent particles using a continuous batch process.

In another embodiment, a continuous batch procedure may be used to remove the organic contaminants from the activated carbon particles. A system for purifying activated carbon particles in this manner is depicted in FIG. 5. A substantially contaminant free water stream is introduced into the system via conduit 213. The water stream is preferably conducted to pump 214, a first heat exchanger 216, a second heat exchanger 218 and first heater 220. The pump 214, first heat exchanger 216, second heat exchanger 218, and first heater 220 together preferably bring the water stream to a temperature and pressure in the vicinity of supercritical conditions for water. A pump 214, such as a positive displacement pump, is preferably used to pressurize the stream. The water stream is brought to the desired pressure, preferably in the range of about 2000 psig. to about 5000 psig. (138 bar to 345 bar), more preferably, above about 3200 psig. (220 bar)

First heat exchanger 216 may be used to preheat the water stream. After the operation of the batch process has started, hot effluent coming out of the reactors 222, 230 and/or 240 may be passed through the heat exchanger 216 via conduit 248. Within heat exchanger 216 the effluent may be contacted with the conduits carrying the water stream through heat exchanger 216. Thus, a portion of the heat from the effluent in conduit 248 may be transferred to the water stream as it passes through heat exchanger 216. After passing through heat exchanger 216 the mixture may be transferred to the second heat exchanger 218.

Second heat exchanger 218 may also be used to preheat the water stream before it reaches the first heater 220. After the operation of the second reactor 262 has started, hot effluent coming out of the second reactor may be passed through the heat exchanger 218 via conduit 257. In a similar manner to heat exchanger 216, heat from the effluent in conduit 257 may also be transferred to the water stream passing through heat exchanger 218. After passing through the heat exchanger 218 the water stream is preferably transferred to the first heater 220.

The heater 220 is preferably used to heat the water stream to temperature at least about the supercritical temperature of water. A heater 220, such as a gas heater, preferably heats the water stream to a temperature between about 700° F. to about 1200° F. (290° C. to 650° C.), more preferably, in the range of about 800° F. to about 1000° F. (370° C. to 540° C.), and more preferably still to a temperature of at least about 900° F. (482° C.). After the water stream is raised to supercritical conditions for water the stream is preferably conducted through conduit 219 to a series of reactors 222, 230, and 240.

As depicted in FIG. 5, reactors 222, 230, and 240 may be coupled to each other such that supercritical water may flow through one, two or all three reactors at once. Preferably, the supercritical water flows through two of the reactors during use, while the third reactor is emptied or filled of contaminated activated carbon particles. The water stream, at a temperature of at least about 900° F. (482° C.) and a pressure sufficient to achieve supercritical conditions for water, may be conveyed to the first reactor 222 through open valve 221. The supercritical water may flow through reactor 222 and into conduit 223. Open valve 226 may allow the water to flow into reactor 230. The water may continue to flow through reactor 230 and through open valve 232 into conduit 248. Valves 224, 228, 234, 236, 242, and 244 may be closed to isolate reactor 240 from the system.

During a typical purification procedure reactor 222, 230 and 240 are preferably filled with contaminated activated carbon particles prior to introducing supercritical water into the reactors. As the water stream passes through reactor 222, the organic contaminants are preferably removed from the activated carbon particles and transferred out of reactor 222 with the water stream. The water stream then passes through reactor 230 where contaminates may be removed from the activated carbon particles contained within reactor 230. Significantly less organic contaminants may be removed from the particles in reactor 230 than are removed from reactor 222. The mixture of water and organic contaminates is preferably conducted out of reactor 230 and into the conduit 248. Supercritical water is prevented from flowing into reactor 240 while valves 234, 236, 242 and 244 are closed. By isolating reactor 240 in this manner activated carbon particles may be added or removed from reactor 240, without having to stop the purification of the activated carbon particles in the other two reactors.

An organics monitor 247 may be used to monitor the concentration of organic contaminants in the effluent leaving reactors 222, 230 or 240. The organics monitor 247 may include an ultraviolet spectrophotometer and/or a refractive index monitor. Other devices which may be used to measure the organic content of the effluent stream may also be included with the organics monitor 247. The monitoring of the concentration of organic contaminants may be used to determine when a substantial portion of the organic contaminants have been removed from the activated carbon particles.

As supercritical water is passed through reactors 222 and 230 the organic concentration of the effluent stream emanating from the first reactor 222 may be monitored. When the concentration of organic contaminants emanating from reactor 222 reaches a sufficiently low level reactor 222 may be isolated from the system, depressurized and emptied of the purified activated carbon particles. This may be accomplished by closing valves 221, 226, and 232. At substantially the same time valves 228, 234, and 242 may be opened such that the supercritical water stream may flow through reactor 230 and reactor 240. The activated carbon particles may be removed from reactor 222 under subcritical conditions, while the particles in reactor 230 and reactor 240 are purified. After the particles are removed from the reactor 222, reactor 222 is refilled with contaminated activated carbon particles and may be reconnected to the system.

Preferably reactors 222, 230, and 240 are configured to allow the movement of the activated carbon particles in a direction from the lower portion of the reactor toward the upper portion of the reactor, i.e. in an upward direction. This may allow the activated carbon particles to be removed from the reactor by reversing the flow of water through the reactor. When water is flowed in an upward direction through the reactors the activated carbon particles may also move in an upward direction. Since the particles are not inhibited from moving in this direction the particles may be pushed out of the reactor. In this manner the reactor may be emptied of activated carbon particles.

The effluent stream from reactor 222, 230, and/or 240, containing a mixture of organic contaminants in water, is preferably conducted to heat exchanger 216 via conduit 248. Heat exchanger 216 preferably allows the effluent stream from reactor 222, 230, and/or 240 to pass through in such a way that the heat from the effluent will preheat the water stream passing through heat exchanger 216 from pump 214. The effluent water may then be transferred to cooler 250. Cooler 250 is preferably used to lower the temperature and pressure of the effluent water to subcritical conditions. The cooled effluent may be collected in holding tank 252.

The holding tank 252 may act as a feed tank for the supercritical oxidation system which includes supercritical oxidation reactor 262. When a sufficient amount of a mixture of water and organic contaminants has been collected in the holding tank 252 the mixture is preferably conducted to second pump 254. Second pump 254 preferably brings the mixture to a pressure in the vicinity of supercritical conditions for water. The mixture may then be transferred to third heat exchanger 256. Heat exchanger 256 may be used to preheat the mixture before it reaches the second heater 260. After operation of the supercritical oxidation reactor 262 has started, hot effluent from reactor 262 coming out of the supercritical reactor may be passed through heat exchanger 256 by means of conduit 263. The effluent from reactor 262 may be passed over the conduit carrying the mixture through heat exchanger 256. After passing through heat exchanger 256 the mixture is transferred to second heater 260. Second pump 254 in combination with heat exchanger 256 and heater 260 preferably bring the mixture to a temperature and pressure in the vicinity of supercritical conditions for water.

After bringing the mixture of water and organic contaminants to the vicinity of supercritical conditions for water the mixture is fed to mixer 261, where it may be mixed with oxidant from oxidant feeder 272 through oxidant feeder line 271. An oxidant feeder valve 274 may be used to control the amount of oxidant added to the water stream. Preferably liquid oxygen, hydrogen peroxide and/or mixtures thereof are added to the mixture.

The mixture of water, organic contaminants and oxidant is preferably transferred to the supercritical oxidation reactor 262. The supercritical oxidation reactor 262 is preferably configured to maintain reactor conditions in the vicinity of supercritical conditions for water. More preferably, the supercritical oxidation reactor 262 is configured to maintain the reactor at supercritical conditions for water. The mixture is preferably conducted through the supercritical oxidation reactor 262 for a time sufficient to ensure substantially complete oxidation (i.e., greater than 99% oxidation) of the organic contaminants contained therein.

After passing through second reactor 262 the resulting water stream is preferably conducted to heat exchangers 256 and 218 through conduits 263 and 257. The heat exchangers preferably allow the water stream from second reactor 262 to pass through in such a way that the heat from the water stream will preheat the streams passing through the heat exchangers. The water stream may then be transferred to cooler 266. Cooler 266 is preferably used to lower the temperature and pressure of the water stream to sub-critical conditions. Gases are preferably released to the atmosphere through conduit 270. Condensed water is preferably transferred from the system through conduit 268.

Figure 6:
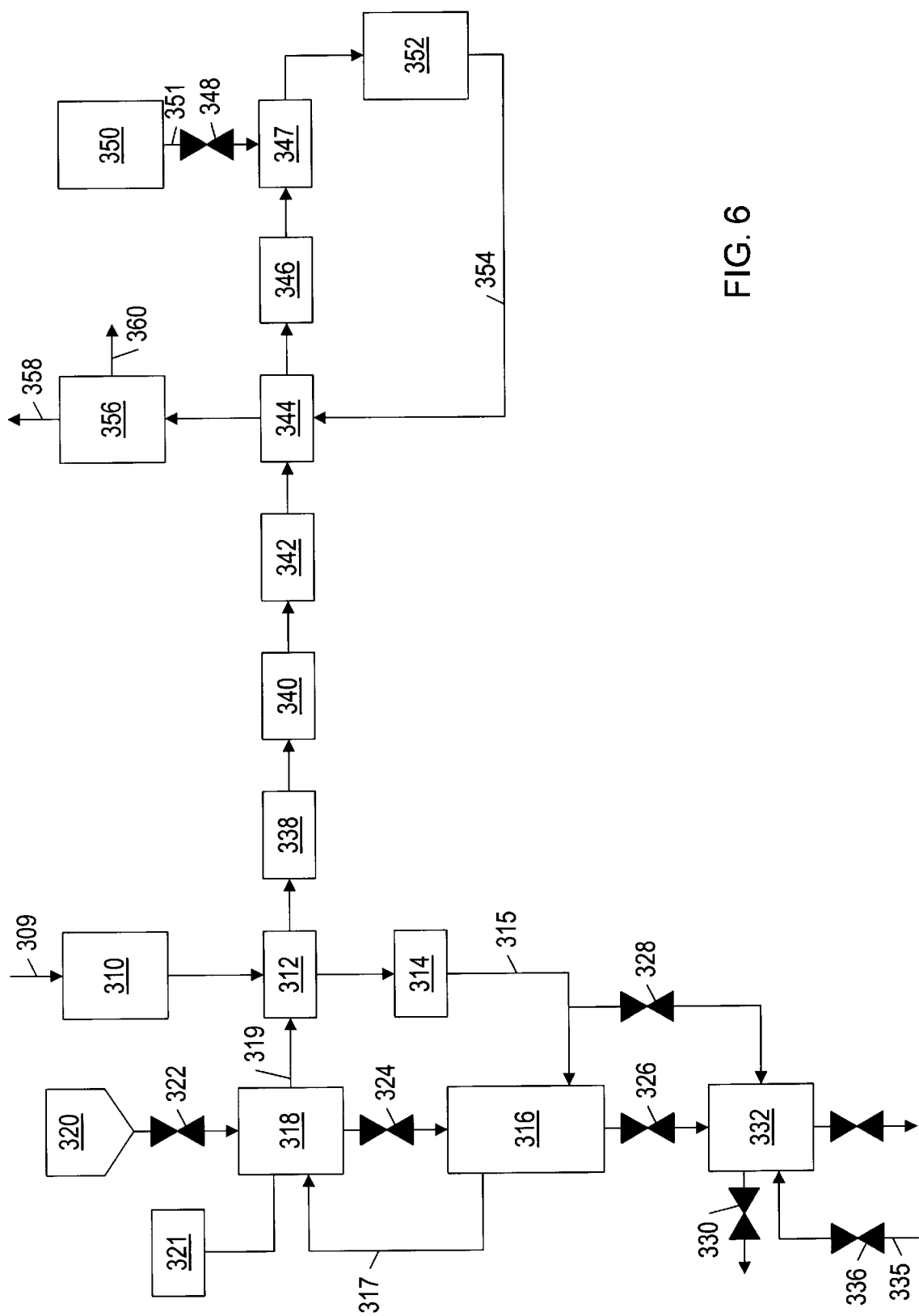
FIG. 6 depicts a system for regenerating the adsorptive capacity of adsorbent particles using a continuous countercurrent extractor.

In another embodiment, a continuous counter current extractor may be used to remove the organic contaminants from the activated carbon particles. A system for purifying activated carbon particles in this manner is depicted in FIG. 6. A substantially contaminant free water stream is preferably introduced into the system via conduit 309. The water stream is preferably conducted to pump 310, first heat exchanger 312, and first heater 314. The pump 310, first heat exchanger 312, and first heater 314 together preferably bring the water stream to a temperature and pressure in the vicinity of supercritical conditions for water. A pump 310, such as a positive displacement pump, is preferably used to pressurize the water stream. The water stream is brought to the desired pressure, preferably in the range of about 2000 psig. to about 5000 psig. (138 bar to 345 bar), more preferably, above about 3200 psig. (220 bar)

First heat exchanger 312 may be used to preheat the water stream. After the operation of the batch process has started, hot effluent coming out of the first reactor 316 may be passed through the heat exchanger 312 via conduits 317 and 319. After passing through heat exchanger 312 the water stream is preferably transferred to the first heater 314.

First heater 314 may be used to heat the water stream to a temperature at least about the supercritical temperature of water. A first heater 314, such as a gas heater, preferably heats the water stream to a temperature between about 700° F. to about 1200° F. (290° C. to 650° C.), more preferably, in the range of about 800° F. to about 1000° F. (370° C. to 540° C.), and more preferably still to a temperature at least about 900° F. (482° C.). After the water stream is raised to supercritical conditions for water the stream is preferably conducted through conduit 315 to first reactor 316.

First reactor 316 is preferably configured to maintain a temperature and pressure in the vicinity of supercritical conditions for water. More preferably, the first reactor 316 is configured to maintain the water stream at a temperature substantially above the temperature required to achieve supercritical conditions for water. The first reactor is preferably maintained at a pressure greater then about 3200 psig. (220 bar). The first reactor is preferably maintained at a temperature of at least about 900° F. (482° C.). The first reactor is preferably oriented substantially vertically such that the water stream enters the lower portion of the reactor and flows toward the upper portion of the reactor, i.e., in an upward direction. The water preferably flows out of the reactor into conduit 317.

A contaminated activated carbon supply source 320 is preferably connected to container 318. The contaminated activated carbon supply source 320 preferably supplies contaminated activated carbon particles into container 318. The contaminated activated carbon particles are preferably substantially dry. Valves 322 and 324 are used to control the rate of addition of the activated carbon particles to the container 318 and the first reactor 316, respectively. Valve 322 may be opened while valve 324 is shut such that activated carbon particles may enter the container 318 but not the first reactor 316. After the particles are added, valve 322 is shut and the container may be pressurized and heated to the vicinity of supercritical conditions for water. The container 318 may be configured to allow the effluent supercritical water from the reactor 316 to flow around the container such that the container is heated to the vicinity of supercritical temperatures. Additionally container 318 may be coupled to pump 321. Pump 321 may be used to raise the pressure of container 318 to supercritical pressures.

Once the activated carbon particles within container 318 are brought to the vicinity of supercritical conditions for water the activated carbon particles may be added to the upper portion of reactor 316 while a water stream is being flowed through the reactor. The activated carbon particles are preferably conducted through the supercritical water flowing through reactor 316. The activated carbon particles are preferably conducted from the upper portion of reactor toward the lower portion of the reactor, i.e. in a downward direction. The rate of movement of the activated carbon particles through the reactor may be controlled by the flow rate of the water stream. In the absence of a flowing water stream the activated carbon particles typically would fall through a water filled reactor at a rate determined in part by gravitational forces and the resistance of the water on the movement of the activated carbon particles. When water is flowing through the reactor an additional force is applied to the activated carbon particles, which may substantially reduce the rate at which the particles are conducted through the first reactor. By adjusting the flow rate of the water stream the rate of movement of the activated carbon particles through the first reactor may also be adjusted. In this manner the amount of time that the activated carbon particles are treated with the supercritical water may be adjusted such that the organic contaminants are substantially removed from the activated carbon particles prior to the particles leaving the first reactor.

At the bottom of the reactor 316 is valve 326 which preferably controls the flow of activated carbon particles out of the reactor and into collection vessel 332. The valve is preferably a ball valve constructed to withstand pressures of at least about 4400 psig. (300 bar) and temperature of at least about 900° F. (500° C.). The flow of particles to the collection vessel is preferably accomplished at supercritical pressures. As the collection vessel is filled, the particles may be emptied by closing valve 326 and depressurizing the collection vessel by opening valve 330. Additionally, cold water may be added through conduit 335, controlled by valve 336, such that the temperature of the collection vessel is lowered. After the collection vessel temperature and pressure are lowered the activated carbon may be removed. The emptied collection vessel may be repressurized and reheated by running supercritical water through conduit 328 into collection vessel 332 and out conduit 330. Once collection vessel 332 is repressurized and reheated additional purified activated carbon may be collected.

The effluent stream from reactor 316 is preferably conducted to container 318 and heat exchanger 312 via conduits 317 and 319. The container 318 is preferably configured to allow the effluent water stream from reactor 316 to pass through in such a way that the heat from the effluent water will preheat the activated carbon particles contained within the container. In a similar manner the effluent may be passed through heat exchanger 312 such that the colder water entering heat exchanger 312 from pump 310 is heated. The effluent water may then be transferred to cooler 338. Cooler 338 is preferably used to lower the temperature and pressure of the effluent to subcritical conditions, The cooled effluent may be collected in holding tank 340.

The holding tank 340 may act as a feed tank for the supercritical oxidation system which includes supercritical oxidation reactor 352. When a sufficient amount of a mixture of water and organic contaminants has been collected in the holding tank 340 the mixture is preferably conducted to the second pump 342. The second pump 342 preferably brings the mixture to a pressure in the vicinity of supercritical conditions for water. The mixture may then transferred to the second heat exchanger 344. Heat exchanger 344 may be used to preheat the water stream before it reaches the second heater 346. After operation of the supercritical oxidation reactor 352 has started, hot effluent coming out of the supercritical reactor may be passed through the heat exchanger 344 by means of conduit 354. After passing through the heat exchanger 344 the mixture is preferably transferred to a second heater 346. The second pump 342 in combination with heat exchanger 344 and heater 346 preferably bring the mixture to a temperature and pressure in the vicinity of supercritical conditions for water.

After heating the mixture of water and organic contaminants to the appropriate temperature the mixture is preferably fed to mixer 347, where it may be mixed with oxidant from oxidant feeder 350 through oxidant feeder line 351. An oxidant feeder valve 348 may be used to control the amount of oxidant added to the water stream. Preferably liquid oxygen, hydrogen peroxide and/or mixtures thereof are added to the mixture.

The mixture of water, organic contaminants and oxidant is preferably transferred to the supercritical oxidation reactor 352. The supercritical oxidation reactor 352 is preferably configured to maintain reactor conditions in the vicinity of supercritical conditions for water. More preferably, the supercritical oxidation reactor 352 is configured to maintain the reactor at supercritical conditions for water. The mixture is preferably conducted through the supercritical oxidation reactor 352 for a time sufficient to ensure substantially complete oxidation (i.e., greater than 99% oxidation) of the organic contaminants contained therein.

The effluent stream emanating from second reactor preferably conducted to the heat exchanger 344 through conduit 354. The heat exchanger 344 preferably allows the effluent stream from the second reactor 352 to pass through in such a way that the heat from the effluent stream will preheat the mixture of water and organic contaminants passing through heat exchanger 344. The effluent stream may then be transferred to cooler 356. Cooler 356 is preferably used to lower the temperature and pressure of the effluent stream to sub-critical conditions. Gases are preferably released to the atmosphere through conduit 358. Condensed water is preferably transferred from the system through conduit 360.

An advantage of any of the systems described above may be that the systems are relatively easy to set up in a variety of locations, preferably near a site where contaminated activated carbon is generated. As mentioned earlier, most activated carbon recycling processes require a central reactivation site due to the size and energy requirements of such processes. The contaminated activated carbon may have to be transported to and from such central reactivation sites, thus adding an additional cost to the recycling process. These transportation costs may be avoided by setting up an onsite recycling system.

Alternatively, a system may be set up inside a vehicle so that the system may be transported to sites which generate contaminated activated carbon particles. The system may be operated while the system resides within the vehicle. This may offer advantages to users that do not use large quantities of activated carbon. These users may require only periodic treatment of activated carbon particles. By transporting the system to the user the cost of transporting the contaminated and purified activated carbon may be avoided. Typically, the cost of transporting activated carbon would be significantly more than the cost of transporting a system.

In another embodiment, a system for purifying a water stream may also be incorporated with a system for purifying adsorbent particles. Preferably, the system allows the continuous purification of a water stream, while also allowing purification of a portion of the adsorbent particles to take place simultaneously.

Figure 8:
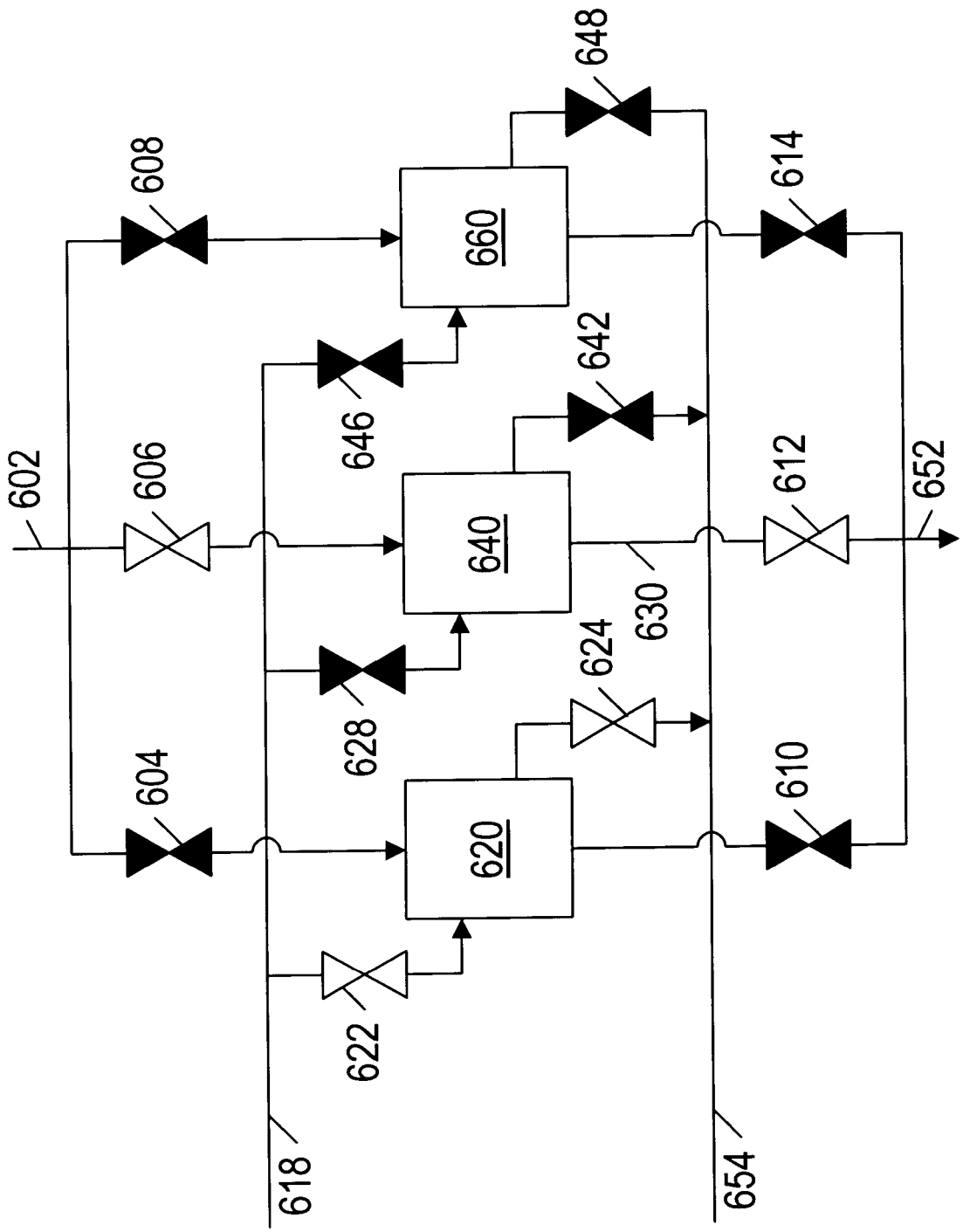
FIG. 8 depicts a batch system for purifying a stream of contaminated water.

FIG. 8 depicts a portion of a continuous batch system which is preferably configured to purify a contaminated water stream using activated carbon particles. The system may also be configured to purify the activated carbon particles by washing the particles with supercritical water. At least two reactors may be used in the system. Preferably three reactors are used. At any given time one of the reactors is preferably filled with clean activated carbon particles. Another reactor preferably contains contaminated activated carbon, generated during a previous purification step. A third reactor may be used so that one reactor may be isolated from the system to allow the addition and/or removal of the activated carbon particles.

Conduit 602 preferably conducts contaminated water into the system. As the water flows toward the reactors a series of valves 604, 606, and 608 are preferably used to transfer the contaminated water to the appropriate reactor. As depicted in FIG. 8, the contaminated water is preferably conducted through open valve 606 and through reactor 640. Valves 604, 608 626, 628, 642 and 644 are preferably closed such that the water stream is conducted to the second reactor 640. As the contaminated water passes through reactor 640, the contaminates may be substantially removed by the activated carbon particles. The water emanating from reactor 640 may be free of contaminants and is conducted from the reactor 640 via conduit 630. Valves 610 and 614 are preferably closed such that the purified water is conducted to the exit conduit 652.

While the contaminated water is being purified in this manner, the first reactor 620 containing contaminated activated carbon particles is preferably treated with supercritical water. Conduit 618 preferably transfers supercritical water into the system. The supercritical water is preferably transferred to reactor 620 through the open valve 622. Valves 628 and 646 are preferably closed to prevent supercritical water from entering the other reactors. As the supercritical water passes through the first reactor 620 the supercritical water may remove a portion of the contaminants from the activated carbon particles. The effluent stream from the reactor is preferably conducted through open valve 624 into exit conduit 654. The effluent stream is preferably conducted via conduit 654 to an oxidation reactor where the organic contaminants removed from the activated carbon particles are oxidized.

The third reactor 660 is preferably isolated from the system, that is the valves are configured such that neither supercritical water nor contaminated water is passed through the reactor. This may be accomplished by closing valves 608, 646, 648, and 614. Once reactor 660 is isolated from the system, activated carbon particles may be added and/or removed from the reactor. Activated carbon particles may need to be removed and/or added when the adsorptive capacity of the particles is no longer adequate to purify a contaminated water stream.

After a period of time has passed, the activated carbon particles in the second reactor 640 may become saturated with contaminates from the contaminated water stream. After this time period the valves may be opened and shut in a manner such that the contaminated water and supercritical water flow to different reactors. In the system depicted in FIG. 8, the contaminated water stream is preferably redirected toward the third reactor 660. The supercritical water is preferably redirected toward the second reactor 640. The first reactor 620 may be isolated from the system so that the adsorptive capacity of the now purified activated carbon may be tested. In this manner a contaminated water stream may be continuously purified, while the used activated carbon particles are simultaneously purified with supercritical water.

Figure 9:
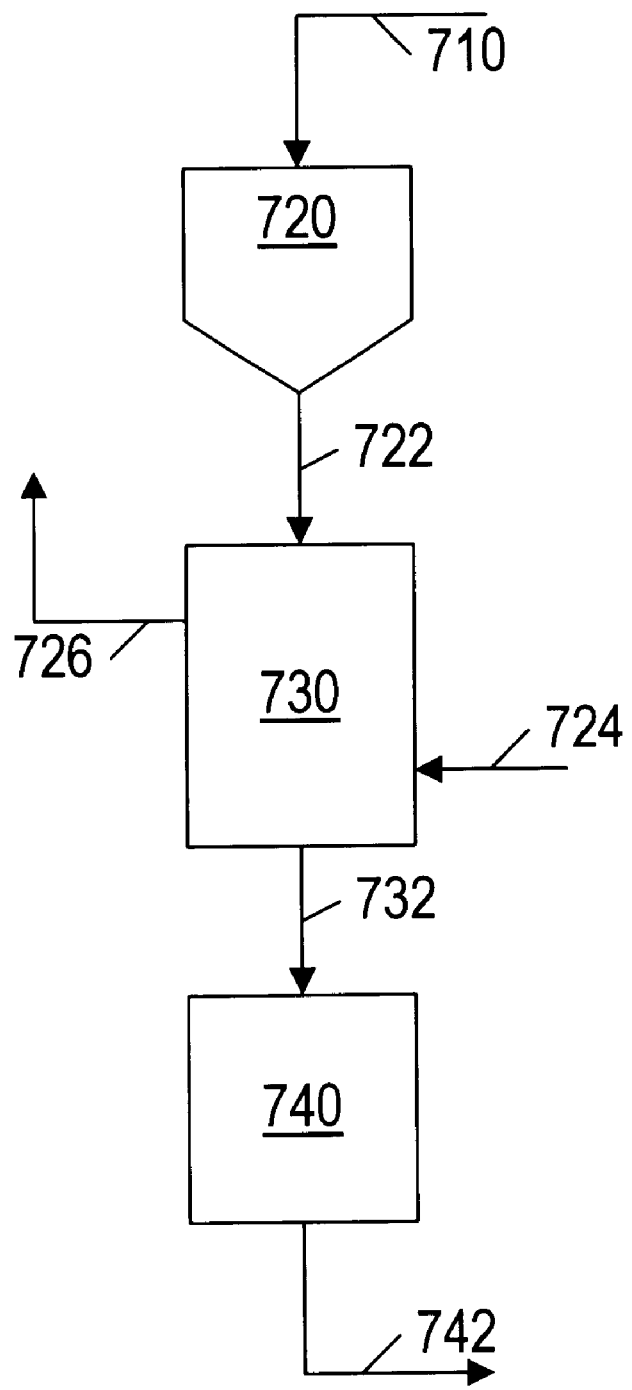
FIG. 9 depicts a continuous extraction system for purifying a stream of contaminated water.

In another embodiment, a system for purifying a stream of contaminated water is presented in FIG. 9. In this system water may be purified by a suspension of activated carbon particles within the water stream. After the water is treated for a sufficient amount of time with the activated carbon particles the water is preferably separated from the particles. The water stream may contain less contaminants than the stream did prior to treatment.

Referring to FIG. 9, a stream of contaminated water is preferably conducted via conduit 724 to reactor 730. The stream is preferably flowed through reactor 730 in an upward direction. As the stream is flowed through reactor 730 activated carbon particles are preferably introduced into the reactor 730 via conduit 722. The activated carbon particles may be supplied by an activated carbon supply system 720, typically a lock hopper system. The activated carbon particles are preferably conducted through the supercritical water flowing through reactor 730. The activated carbon particles are preferably conducted from the upper portion of reactor toward the lower portion of the reactor, i.e. in a downward direction. The rate of movement of the activated carbon particles through the reactor may be controlled by the flow rate of the water stream. In the absence of a flowing water stream the activated carbon particles typically would fall through a water filled reactor at a rate determined in part by gravitational forces and the resistance of the water on the movement of the activated carbon particles. When water is flowing through the reactor an additional force is applied to the activated carbon particles, which may substantially reduce the rate at which the particles are conducted through the first reactor. By adjusting the flow rate of the water stream the rate of movement of the activated carbon particles through the first reactor may also be adjusted. In this manner the amount of time that the activated carbon particles are in contact with the contaminated water may be adjusted such that the organic contaminants are substantially removed from the contaminated water prior to the water stream leaving the reactor via conduit 726.

When the activated carbon particles reach the bottom of the reactor 730 they are preferably conducted to a collection vessel 740 via conduit 732. The collected activated carbon particles may then be transferred via conduit 742 to a supercritical water reactor system. Supercritical reactor systems for purifying activated carbon particles have been described in previous embodiments. Within the supercritical water reactor system the activated carbon particles are preferably purified of organic contaminants. Eventually, the purified activated carbon particles may be reintroduced into the system via conduit 710 and reused for the purification of contaminated water streams. In this manner, a contaminated water stream may be continuously purified, while the used activated carbon particles are purified with supercritical water.

Other reactor assemblies operating in the vicinity of supercritical conditions for water are described in detail in the following patents or patent applications: U.S. Pat. No. 5,403,533 to Hazlebeck et al., U.S. Pat. No. 4,141,829 to Thiel et al., U.S. Pat. No. 4,292,953 to Dickinson, U.S. Pat. No. 4,338,199 to Modell, U.S. Pat. No. 4,377,066 to Dickinson, U.S. Pat. No. 4,380,960 to Dickinson, U.S. Pat. No. 4,543,190 to Modell, U.S. Pat. No. 4,564,458 to Burleson, U.S. Pat. No. 4,593,202 to Dickinson, U.S. Pat. No. 4,594,164 to Titmas, U.S. Pat. No. 4,792,408 to Titmas, U.S. Pat. No. 4,822,394 to Zeigler et al., U.S. Pat. No. 4,822,497 to Hong et al., U.S. Pat. No. 4,861,497 to Welch et al., U.S. Pat. No. 4,891,139 to Zeigler et al., U.S. Pat. No. 4,113,446 to Modell et al., U.S. Pat. No. 5,106,513 to Hong, U.S. Pat. No. 4,898,107 to Dickinson, U.S. Pat. No. 4,983, 296 to McMahon et al., U.S. Pat. No. 5,011,614 to Gresser et al., U.S. Pat. No. 5,053,142 to Sorensen et al., U.S. Pat.

No. 5,057,231 to Mueller et al., U.S. Pat. No. 5,133,877 to Rofer et al., U.S. Pat. No. 5,183,577 to Lehmann, U.S. Pat. No. 5,192,453 to Keckler et al., U.S. Pat. No. 5,221,486 to Fassbender, U.S. Pat. No. 5,232,604 to Swallow et al., U.S. Pat. No. 5,232,605 to Baur et al., U.S. Pat. No. 5,240,619 to Copa et al., U.S. Pat. No. 5,250,193 to Sawicki et al., U.S. Pat. No. 5,252,224 to Modell et al., U.S. Pat. No. 4,822,497 to Hong et al., U.S. Pat. No. 5,551,472 to McBrayer et al., U.S. Pat. application Ser. No. 08/399,703 to McBrayer et al., U.S. Pat. No. 5,620,606 to McBrayer et al., U.S. Pat. No. 5,582,715 to McBrayer et al., U.S. patent application Ser. No. 08/260,954 to McBrayer et al., U.S. Pat. No. 5,552,039 to McBrayer et al., and U.S. patent application Ser. No. 08/254,956 to Eller et al., U.S. patent application Ser. No. 08/657,899 to McBrayer et al. The above-referenced patents and patent applications are hereby incorporated by reference.

Figure 7:
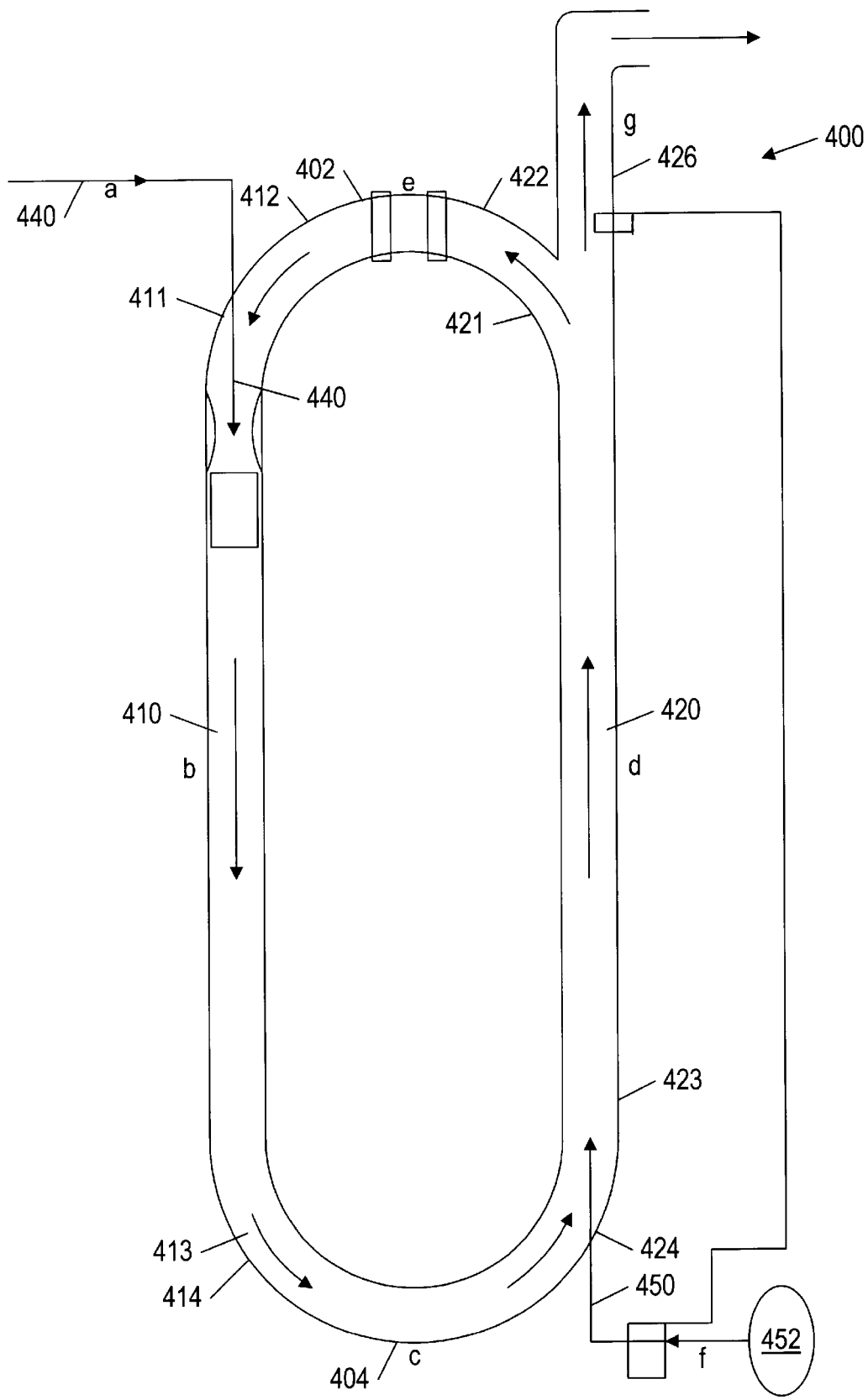
FIG. 7 depicts a recycle reactor.

In an alternate embodiment a recycle reactor, described below, may be used in the above described method and system for either the first and/or second reactor. FIG. 7 depicts an embodiment of a recycle reactor 400. FIG. 7 shows a system that may be used for heating an input stream that is below the supercritical temperature for water to a temperature above the supercritical temperature of water. It includes a recycle reactor 400 which is constructed to contain fluid at supercritical conditions for water during use. Throughout the following description the term "ignition temperature" denotes the minimum temperature that a stream must obtain to experience a relatively rapid, significant rise in temperature due to the heat generated from the oxidation of the stream.

Recycle reactor 400 includes a first substantially vertically aligned conduit 410 having a top end 411 and a bottom end 413. The first conduit 410 is connected to a input stream conduit 440 such that the input stream is introduced into the first conduit 410 from the input stream conduit 440 during use. Recycle reactor 400 also includes a second substantially vertically aligned conduit 420 having a top end 421 and a bottom end 423. The second conduit 420 is adapted to contain water at supercritical conditions during use. The system generally produces a stream that is hotter and less dense than the input stream. The stream flows upwardly through the second conduit during use. Recycle reactor 400 also includes a top conduit 402 connecting the top end 411 of the first conduit 410 to the top end 421 of the second conduit 420, and a bottom conduit 404 connecting the bottom end 413 of the first conduit 410 to the bottom end 421 of the second conduit 420.

As shown in FIG. 7, recycle reactor 400 is in the shape of a oval loop with curved conduits 412, 414, 422, and 424, however other reactor "looped" shapes such as squares, rectangles, circles, etc. would also be operable within the scope of the invention. Curved conduits 412, 414, 422, and 424 are advantageous in that they tend to prevent erosion and/or plugging at the turning points in the reactor.

Conduits 410 and 420 are only substantially vertically aligned which means, in the context of this patent, that these conduits 410 and 420 are at least partially vertically aligned such that gravitational forces will exert on downward force on fluids within these first and second conduits 410 and 420. Absent other forces in place, fluids in these first and second conduits 410 and 420 will tend to be forced downward by such gravity from the top ends 411 and 421 to the bottom ends 413 and 423. Conduits 402 and 404 are preferably but not necessarily substantially horizontally aligned.

Recycle reactor 400 preferably includes an oxidant source 452 connected to the recycle reactor 400 via oxidant conduit 450 such that oxidant is introduced during use from the source 452 into the recycle reactor 400 at a location downstream of the first conduit 410 but upstream of the top conduit 402. For instance, conduit 450 may be located such that oxidant is introduced into conduits 404 or 420. Preferably conduit 450 is located near the bottom end of second conduit 420 such that oxidation occurs and thereby tends to heat the stream and cause reaction products to flow upwardly through second conduit 420. In this manner the thermosiphon effect (caused by density differences between streams within the reactor) within the recycle reactor is enhanced. This thermosiphon effect is preferably used to move fluid in the recycle reactor without any substantial cooling or heating of fluids in the recycle reactor from an external source. The flow of oxidant may be inhibited, e.g., when adsorbent particles are treated within the recycle reactor, to keep the oxidant concentration in the stream as low as possible.

Recycle reactor 400 preferably includes an effluent conduit 426 connected to the recycle reactor 400 downstream of the location that oxidant is introduced into the recycle reactor 400, the effluent conduit 426 being connected to allow at least some of the reaction products stream to flow from the recycle reactor and into the effluent conduit during use.

The recycle reactor 400 is configured such that fluid flows during use from the first conduit 410 to the bottom conduit 404, the bottom conduit 404 to the second conduit 420, and the second conduit 420 to the top conduit 402. For instance, as shown in FIG. 7 fluid may flow via paths a, b, c, d, e, and then a. Oxidant may join this fluid via path f. A portion of the reaction products stream may exit the recycle reactor via path g.

Preferably at least a portion of the reaction products stream recycles during use from the top conduit 402 to the first conduit 410, thereby mixing with and heating the input stream to form a mixture above the supercritical temperature for water. Thus the input stream may preferably be heated to above the oxidation reaction ignition temperature without substantial heat exchange with an external source of heat—that is, without substantial heat exchange with other fluids via a heat exchanger, fired heater, or the like. This is advantageous because typically heat exchangers and/or fired heaters are costly to build and operate, especially when such equipment is designed to operate at or near supercritical conditions for water. Instead of using such equipment, heat is provided from the heated recycled stream, the heat having been generated from the oxidation that occurred after the oxidant was added.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

What is claimed is:

1. A method of restoring activity to activated carbon particles, the activated carbon particles comprising at least one organic contaminant, comprising:

treating the activated carbon particles with water in a first reactor to remove organic contaminant from the activated carbon particles and entrain the organic contaminant in the water, wherein the first reactor operates at a temperature between about 900° F. (482° C.) and about 1200° F. (650° C.), and wherein the first reactor operates at a pressure sufficient to maintain supercritical conditions for water, and wherein the activated carbon particles are mixed in the water; and separating the activated carbon particles from the water, wherein organic contaminant removed from the activated carbon particles remains in the water, wherein the temperature during separation is maintained at a temperature of at least about 900° F. (482° C.), and wherein the pressure during separation is sufficient to maintain supercritical conditions for water.

2. The method of claim 1, further comprising forming a stream by combining the activated carbon particles and the water prior to treating the activated carbon particles in the first reactor, wherein the stream comprises a suspension of the activated carbon particles in the water.

3. The method of claim 1, further comprising forming a stream by combining the activated carbon particles and the water prior to treating the activated carbon particles in the first reactor, wherein the stream comprises a suspension of the activated carbon particles in the water, and wherein the stream is heated to a temperature and pressure at least in the vicinity of supercritical conditions for water prior to treating the activated carbon particles in the first reactor.

4. The method of claim 1, further comprising adding the activated carbon particles to the first reactor prior to treating the activated carbon particles with water.

5. The method of claim 1 wherein the activated carbon particles are contaminated with an organic compound prior to treating the activated carbon particles with water.

6. The method of claim 1 wherein the treatment of the activated carbon particles is performed at a pressure of at least about 3200 psig. (220 bar).

7. The method of claim 1 wherein the treatment of the activated carbon particles is performed for a time sufficient to remove substantially all of the organic contaminant from the activated carbon particles.

8. The method of claim 1 wherein the first reactor substantially inhibits movement of the activated carbon particles through the first reactor.

9. The method of claim 1 wherein the separation of the activated carbon particles is performed by a cyclone separator.

10. The method of claim 1 wherein the separation of the activated carbon particles is performed by a filter.

11. The method of claim 1 wherein the activated carbon particles are separated from the water into a collection vessel.

12. The method of claim 1 wherein the activated carbon particles are separated from the water into at least two collection vessels, wherein the first collection vessel is used to collect the activated carbon particles while the second collection vessel is emptied of the activated carbon particles, and wherein the second collection vessel is used to collect the activated carbon particles while the first collection vessel is emptied of the activated carbon particles.

13. The method of claim 1, further comprising adding an oxidant to the water subsequent to the separation of the activated carbon particles from the water.

14. The method of claim 13, further comprising treating the water in a second reactor at a temperature and a pressure at least in the vicinity of supercritical conditions for water subsequent to the addition of the oxidant to the water such that the organic contaminant is substantially oxidized.

15. The method of claim 13, further comprising treating the water in a second reactor at a temperature and a pressure at least at supercritical conditions for water subsequent to the addition of the oxidant to the water such that the organic contaminant is substantially oxidized.

16. The method of claim 1, further comprising adding the activated carbon particles to the first reactor prior to treating the activated carbon particles with water, and further comprising introducing the water to the first reactor, wherein the water is heated to a temperature of at least about 900° F. (482° C.) and a pressure sufficient to maintain supercritical conditions for the water.

17. The method of claim 16 further comprising passing the water through the first reactor for a time sufficient to substantially remove the organic contaminants from the activated carbon.

18. The method of claim 16 further comprising removing the activated carbon from the first reactor subsequent to treating the particles with the water.

19. A method of restoring activity to activated carbon particles, the activated carbon particles comprising at least one organic contaminant, comprising:

introducing a stream comprising activated carbon particles and water into a first reactor, wherein the activated carbon particles are mixed in the water;

treating the stream in the first reactor at a temperature between about 900° F. (482° C.) and about 1200° F. (650° C.), and a pressure sufficient to maintain supercritical conditions for water, wherein organic contaminant is removed from the activated carbon particles; and separating the activated carbon particles from the water, wherein removed organic contaminant remains in the water; and wherein the temperature during separation is at least about 900° F. (482° C.) and the pressure is sufficient to maintain supercritical conditions for water during the separation.

20. The method of claim 19 wherein the stream is heated to a temperature and pressure of at least about the vicinity of supercritical conditions for water prior to introducing the stream into the first reactor.

21. The method of claim 19 wherein the activated carbon particles are contaminated with an organic compound prior to treating the activated carbon particles with water.

22. The method of claim 19 wherein the treatment of the activated carbon particles is performed for a time sufficient to remove substantially all of the organic contaminant from the activated carbon particles.

23. The method of claim 19 wherein the separation of the activated carbon particles is performed by a cyclone separator.

24. The method of claim 19, further comprising adding an oxidant to the water subsequent to the separation of the activated carbon particles from the water.

25. The method of claim 24, further comprising treating the water in a second reactor at a temperature and pressure of at least about the vicinity of supercritical conditions for water subsequent to the addition of an oxidant to the water such that the organic contaminant is substantially oxidized.

26. A method of restoring activity to activated carbon particles, comprising:

flowing a water stream through a first reactor containing activated carbon particles to remove organic contaminant from the activated carbon particles, wherein the water stream is at a temperature between about 900° F. (482° C.) and about 1200° F. (650° C.), and wherein the water stream is at a pressure sufficient to maintain supercritical conditions for the water stream.

27. The method of claim 26 wherein the first reactor substantially inhibits movement of the activated carbon particles through the first reactor.

28. The method of claim 26 wherein the water stream is heated to a temperature at least about 900° F. (482° C.) and a pressure sufficient to maintain supercritical conditions for the water prior to flowing the water stream through the first reactor.

29. The method of claim 26 wherein the activated carbon particles are contaminated with an organic compound prior to treating the activated carbon particles with water.

30. The method of claim 26 wherein the water stream is flowed through the first reactor for a time sufficient to remove substantially all of the organic contaminant from the activated carbon particles.

31. The method of claim 26, further comprising monitoring a concentration of the organic contaminant in the water stream flowing out of the first reactor.

32. The method of claim 26, further comprising monitoring the ultraviolet absorption of the water stream flowing out of the first reactor.

33. The method of claim 26, further comprising monitoring the refractive index of the water stream flowing out of the first reactor.

34. The method of claim 26, further comprising adding an oxidant to the water subsequent to flowing the water through the first reactor.

35. The method of claim 34, further comprising treating the water in a second reactor at a temperature and pressure of at least about the vicinity of supercritical conditions for water subsequent to the addition of an oxidant to the water such that the organic contaminant is substantially oxidized.

36. A method of restoring activity to adsorbent particles, the adsorbent particles comprising at least one contaminant, comprising:

treating the adsorbent particles with water in a first reactor at a temperature of at least about 900° F. (482° C.) and a pressure sufficient to maintain supercritical conditions for the water, wherein the adsorbent particles are mixed in the water, and wherein contaminant is removed from the adsorbent particles and entrained in the water; and separating the adsorbent particles from the water, wherein the removed contaminant remains in the water, and wherein the separation is performed at a temperature of at least about 900° F. (482° C.) and a pressure sufficient to maintain supercritical conditions for the water during the separation.

37. The method of claim 36 wherein the adsorbent particles are activated carbon particles.

38. The method of claim 36 wherein the adsorbent particles are contaminated with an organic compound prior to treating the adsorbent particles with water.

39. The method of claim 36, further comprising adding an oxidant to the water subsequent to the separation of the adsorbent particles from the water.

40. The method of claim 36, further comprising treating the water in a second reactor at a temperature and pressure of at least about the vicinity of supercritical conditions for water subsequent to the addition of an oxidant to the water such that the contaminant is substantially oxidized.

41. A method of restoring activity to activated carbon particles, the activated carbon particles comprising at least one organic contaminant, comprising:

treating the activated carbon particles with water in a first reactor at a temperature of at least about 900° F. (482° C.) and a pressure sufficient to maintain supercritical conditions for water, wherein the activated carbon particles are mixed in the water, and wherein organic contaminant is removed from the activated carbon particles into the water;

separating the activated carbon particles from the water, wherein removed organic contaminant remains in the water, and wherein the temperature and pressure of the water is maintained at a temperature of at least about 900° F. (482° C.) and a pressure sufficient to maintain supercritical conditions for water during the separation;

adding an oxidant to the water subsequent to the passage of the water through the first reactor; and treating the water in a second reactor at a temperature and pressure at least about the vicinity of supercritical conditions for water subsequent to the addition of an oxidant to the water such that the organic contaminant is substantially oxidized.

42. A method of restoring activity to activated carbon particles, the activated carbon particles comprising at least one organic contaminant, comprising:

flowing a water stream at a temperature of at least about 900° F. (482° C.) and a pressure sufficient to maintain supercritical conditions for water through a first reactor, wherein the water stream flows from a lower portion of the first reactor towards an upper portion of the first reactor;

introducing activated carbon particles into the upper portion of the first reactor, wherein the activated carbon particles are conducted through the water stream from the upper portion of the first reactor towards the lower portion of the first reactor; and transferring organic contaminant from the activated carbon particles to the water stream.

43. The method of claim 42, further comprising raising a temperature and pressure of the activated carbon particles to a temperature and pressure at least in the vicinity of supercritical conditions for water prior to introducing the activated carbon particles into the first reactor.

44. The method of claim 42, wherein a flow rate of the water stream through the first reactor is configured to inhibit movement of the activated carbon particles through the first reactor.

45. The method of claim 42, wherein the water stream is heated to a temperature at least about 900° F. (482° C.) and a pressure sufficient to maintain supercritical conditions for water prior to flowing the water stream through the first reactor.

46. The method of claim 42, wherein the activated carbon particles are contaminated with an organic compound prior to treating the activated carbon particles with water.

47. The method of claim 42, further comprising collecting the activated carbon particles in a collection vessel subsequent to treating the activated carbon particles with the water stream.

48. The method of claim 42, further comprising collecting the activated carbon particles in a collection vessel subsequent to treating the activated carbon particles with the water stream, wherein the activated carbon particles are collected at a temperature of at least about 900° F. (482° C.) and a pressure sufficient to maintain supercritical conditions for water.

49. The method of claim 42, further comprising cooling the water stream to a temperature and pressure substantially below the vicinity of supercritical conditions for water subsequent to flowing the water stream through the first reactor.

50. The method of claim 42, further comprising adding an oxidant to the water stream subsequent to flowing the water stream through the first reactor.

51. The method of claim 50, further comprising treating the water stream in a second reactor at a temperature and pressure of at least about the vicinity of supercritical conditions for water subsequent to the addition of an oxidant to the water such that the organic contaminant is substantially oxidized.

52. A method of restoring activity to activated carbon particles, the activated carbon particles comprising at least one organic contaminant, comprising:

flowing a water stream at a temperature of at least about 900° F. (482° C.) and a pressure sufficient to maintain supercritical conditions for the water through a first reactor containing contaminated activated carbon particles to transfer organic contaminant from the activated carbon particles to the water stream;

filling a second reactor with contaminated activated carbon particles;

flowing the water stream at a temperature of at least about 900° F. (482° C.) and a pressure sufficient to maintain supercritical conditions for the water through the second reactor to transfer organic contaminant from the activated carbon particles to the water stream; and removing the activated carbon particles from the first reactor, after the activated carbon particles are substantially purified by the water stream, wherein the activated carbon particles are removed while the water stream is flowing through the second reactor.

53. The method of claim 52 wherein the first reactor substantially inhibits movement of the activated carbon particles through the first reactor.

54. The method of claim 52 wherein the second reactor substantially inhibits movement of the activated carbon particles through the second reactor.

55. The method of claim 52 wherein the water stream is heated to a temperature at least about 900° F. (482° C.) and a pressure sufficient to maintain supercritical conditions for the water prior to flowing the water stream through the first reactor.

56. The method of claim 52 wherein the activated carbon particles are contaminated with an organic compound prior to treating the activated carbon particles with water.

57. The method of claim 52 wherein the water stream flows through the first reactor for a time sufficient to remove substantially all of the organic contaminant from the activated carbon particles.

58. The method of claim 52 wherein the water stream flows through the second reactor for a time sufficient to remove substantially all of the organic contaminant from the activated carbon particles.

59. The method of claim 52, further comprising monitoring a concentration of the organic contaminant in the water stream flowing out of the first reactor, and further comprising monitoring a concentration of the organic contaminant in the water stream flowing out of the second reactor.

60. The method of claim 52, further comprising adding an oxidant to the water subsequent to flowing the water through the activated carbon particles.

61. The method of claim 52, further comprising treating the water in a third reactor at a temperature and pressure of at least about the vicinity of supercritical conditions for water subsequent to the addition of an oxidant to the water such that the organic contaminant is substantially oxidized.

62. The method of claim 52, further comprising automatically switching the water stream from the first reactor to the second reactor after passage of an amount of time sufficient to remove substantially all of the contaminant from the activated carbon, wherein the water is substantially inhibited from passing through the first reactor.

63. The method of claim 41, further comprising removing oxidizers from the mixture of water and activated carbon particles before treating the activated carbon particles with water in the first reactor.

64. The method of claim 41, wherein the first reactor substantially inhibits movement of the activated carbon particles through the first reactor.

65. The method of claim 41, wherein the separation of the activated carbon particles is performed by a cyclone separator.

66. The method of claim 41, wherein the separation of the activated carbon particles is performed by a filter.

67. The method of claim 41, wherein the activated carbon particles are separated from the water into at least two collection vessels, wherein the first collection vessel is used to collect activated carbon particles while the second collection vessel is emptied of activated carbon particles, and wherein the second collection vessel is used to collect activated carbon particles while the first collection vessel is emptied of activated carbon particles.

* * * * *